(12) United States Patent
Berger et al.

(10) Patent No.: US 9,672,234 B2
(45) Date of Patent: Jun. 6, 2017

(54) DATABASE AND DATABASE PROCESSING METHODS

(75) Inventors: Jonathan Richard Berger, Enfield (GB); Gawain Bosworth, Enfield (GB); David Edward McWalter, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 927 days.

(21) Appl. No.: 12/209,958

(22) Filed: Sep. 12, 2008

(65) Prior Publication Data

US 2009/0077076 A1 Mar. 19, 2009

(30) Foreign Application Priority Data

Sep. 14, 2007 (GB) .................................. 0717970.8

(51) Int. Cl.
*G06F 17/30* (2006.01)

(52) U.S. Cl.
CPC .............................. *G06F 17/30327* (2013.01)

(58) Field of Classification Search
CPC ......... G06F 17/30312; G06F 17/30321; G06F 17/30327; G06F 17/30424
USPC .................................................. 707/797, 807
See application file for complete search history.

(56) References Cited

U.S. PATENT DOCUMENTS

| | | | |
|---|---|---|---|
| 6,029,170 A | 2/2000 | Garger et al. | |
| 6,421,660 B1 | 7/2002 | Glaise | |
| 6,594,675 B1 | 7/2003 | Schneider | |
| 7,111,071 B1 | 9/2006 | Hooper | |
| 7,249,149 B1 * | 7/2007 | Eatherton et al. ......... | 707/104.1 |
| 7,624,226 B1 * | 11/2009 | Venkatachary et al. ...... | 711/108 |
| 2002/0065812 A1 | 5/2002 | Keith, Jr. | |
| 2003/0123397 A1 * | 7/2003 | Lee ...................... | H04L 45/742 |
| | | | 370/256 |
| 2005/0027679 A1 | 2/2005 | Sample | |
| 2006/0004721 A1 | 1/2006 | Bedworth et al. | |
| 2006/0015516 A1 | 1/2006 | Benakot et al. | |

FOREIGN PATENT DOCUMENTS

GB 2406681 A 4/2005

OTHER PUBLICATIONS

UK Search Report dated Jan. 16, 2008 for Application No. GB0717970.8, pp. 1-3.

(Continued)

*Primary Examiner* — James Trujillo
*Assistant Examiner* — Cheryl M Shechtman
(74) *Attorney, Agent, or Firm* — EIP US LLP

(57) ABSTRACT

Databases and methods for storing, processing and searching data in database tree structures are provided. More particularly, a method for processing data stored in database tree structures for use in data packet routing applications, and a method of searching a database containing data stored in a tree structure, using a search key, are provided. The tree structure includes a plurality of nodes. Data relating to a first node and a second node is stored in the database. The data includes a first node key and a second node key which is prefixed by the first node key. The tree structure is searched using a search key by traversing the second node and determining if the first node key has a prefix which matches the search key.

18 Claims, 16 Drawing Sheets

(56) References Cited

OTHER PUBLICATIONS

European Search Report dated Dec. 23, 2008 for Application No. 08164370.2-1527, pp. 1-3.
European Search Report dated Dec. 23, 2008 for Application No. 08165520.1-1527, pp. 1-7.
Uga et al, "A Fast and Compact Longest Match Prefix Look-up Method Using Pointer Cache for Very Long Network Address," Proceedings of IEEE ICCCN, Oct. 1999, pp. 595-602.

\* cited by examiner

DATABASE AND DATABASE PROCESSING METHODS

CROSS-REFERENCE TO RELATED APPLICATIONS

This application claims priority under 35 U.S.C. §119(a) to Great Britain application no. GB 0717970.8, filed Sep. 14, 2007, the entire disclosure of which is incorporated by reference herein.

BACKGROUND OF THE INVENTION

Field of the Invention

The present application relates to databases and methods for storing and searching data in database tree structures. In particular, but not exclusively, the present application relates to the processing of data stored in database tree structures for use in data packet routing applications.

Description of the Related Technology

Internet protocol (IP) networks include a number of interconnected router entities which are responsible for making decisions as to which paths data packets may flow through from source to destination. Routing protocols are used to gain information about the network and to determine routes between particular network destinations or different areas or subnets of the network. These routes may be stored at each router in a database known as a routing table. The process of creating and maintaining the contents of a routing table is commonly referred to as IP routing.

A router may also store information necessary for carrying out forwarding of data packets in a database commonly known as a forwarding table. The process of receiving and transmitting data packets onto their destination using information stored in a forwarding table is commonly referred to as IP forwarding.

A routing table is generally not used directly in the packet forwarding process. Instead, the packet routing process outputs data relating to selected routes to a forwarding table according to route information and one or more routing protocols such as the Routing Information Protocol (RIP) or the Border Gateway Protocol (BGP). The contents of the forwarding table may then be accessed during the packet forwarding process, for example using efficient hardware implementations.

A data packet transmitted into an IP network will include an IP destination address. IPv4 addresses are 32 bits long, which gives scope for over 4 billion IP addresses, and IPv6 addresses are still larger. Exchanging and updating forwarding information for this number of IP addresses at each router is generally impractical.

Instead, a router will typically maintain a forwarding table containing a number of IP address prefix entries and forwarding information corresponding to each of these prefix entries. When information relating to a network destination address arrives at a router, an IP address for the network destination may be examined by the router which may then search its routing table for the longest match to the IP destination address for the network destination. The longest match comes in the form of the longest prefix matching the destination IP address, i.e. the route which has the greatest number of initial bits matching the IP network address. This is known as the 'longest prefix match.'

The router may then output this information to a forwarding table, so that when data packets for this destination address arrive at the router, they may be forwarded by a packet forwarding function or module in the router using forwarding information contained in the forwarding table. The packet forwarding process may be repeated as often as required, and a data packet may be forwarded from router to router, until it arrives at the desired IP destination address.

An IPv4 address is typically denoted as a series of four decimal numbers separated by decimal points. Each of the decimal numbers represents eight bits of a 32 bit IPv4 address, so that each decimal number ranges from zero to 255.

A prefix refers to an IP address or its initial portion. Using IPv4 for example "192.168/16" is a 16-bit prefix of "192.168.1.4", "192.168.200.200" and "192.168.26.8", etc. In fact, "192.168/16" is a 16-bit prefix of all the addresses "192.168.x.y" where $0 \leq x \leq 255$ and $0 \leq y \leq 255$. A routing table at a router containing routing information for the prefix "192.168/16" may thus be able to route data packets for all IP destination addresses in the range "192.168.x.y". However, the router may also contain more specific routing information for a 32 bit IP destination such as "192.168.4.5". A network IP address may thus be compared with all prefixes in the router's routing table in order to provide suitable, e.g. the most specific, routing information in the form of the longest matching prefix, which may then be output to a forwarding table.

Routing in IP networks thus involves a large amount of searching through routing tables of a large number of routers. Further, the routing tables may change frequently when new routes are added and other routes become obsolete. It is therefore desirable that the algorithms and data structures for implementing such systems are efficient in terms of high search speed whilst required data storage resources are kept down.

A tree is a widely-used data structure with a tree-shaped form having a set of linked nodes stemming from a root node. Each node may contain a value or a condition and has zero or more child nodes, which are located immediately below it in the tree. A node that has a child is called the child's parent. A node has at most one parent. A leaf node is a node of a tree data structure that has zero child nodes, which are often furthest from the root node.

An ancestor of a node is that node's parent, or that node's parent's parent, and so on. The root is ancestor to every other node in the tree. The set of ancestors of a given node are the (shortest) path through the tree from the root to that node. The descendants of a node are that node's children, or that node's children's children, and so on. Node A is an ancestor of node B if and only if node B is a descendant of node A.

A binary search tree is a binary tree data structure where each node has a corresponding key. The left subtree of a node in a binary search tree contains only values less than the node's value and the right subtree of a node in a binary search tree contains only values greater than or equal to the node's value. Sorting and search algorithms for binary trees tend to be relatively efficient.

A digital tree is a tree for storing strings in which nodes are organised by substrings common to two or more strings. Searching of a digital tree involves use of the search keys only, i.e. values associated with each node are not read at each node as the tree is traversed. Instead, a node value may be read only once a suitable node key is found during search of the tree.

A trie, sometimes called a prefix tree, is an ordered tree data structure that is used to store an associative array where the keys are strings. Unlike a binary search tree, no node in the tree stores the key associated with that node. Instead, the position of a node in the tree determines what key the node is associated with. All the descendants of any one node have a common prefix of the string associated with that node. The root node is commonly associated with the empty string.

Advantages of tries include fast key lookup time and their suitability for longest-prefix matching. Longest-prefix matching involves identifying a node whose node key shares the longest prefix with a given search key. Tries also allow association of a search key with an entire group of node keys that have a common prefix. Tries have a disadvantage that when the set of node keys is sparse, i.e. when the actual node keys form a small subset of the set of potential keys, many of the internal nodes (non-leaf nodes) in the trie only have one descendant, giving the trie a high space occupancy.

The Patricia algorithm, 'Practical Algorithm to Retrieve Information Coded in Alphanumeric', (Donald R. Morrison, Journal of the ACM, Column 15, Issue 4, October 1968, pp 514-534) is an algorithm which provides a flexible means of storing, indexing, and retrieving information in a large file, which is economical of index space and of re-indexing time. It does not require rearrangement of text or indices as new material is added. The Patricia algorithm can be used to create and process Patricia tree structures.

A Patricia tree, sometimes called a radix tree, is an example of a binary digital trie in which any node which is an only child is merged with its parent. Traversal of a conventional trie uses every part of the key to determine which subtree to branch to, whereas by storing a search key part identifier, a Patricia tree nominates which element of the search key should be used next to determine the branching and hence which node should be traversed next. This removes the need for any nodes in the tree with just one descendant, so that only genuine branches are included in the index. This means that the index size is independent of the length of stored phrases.

The Patricia algorithm allows quick determination of whether a search key corresponds to a node key in the tree, for n nodes requiring 'of the order of log n' computations (O(log n)), whether a search key is prefixed by any node key in the tree, and if so which such prefix is longest in O(log n) computations, and whether a search key prefixes any node keys in the tree in O(log n) computations, and if so to walk through the m node keys prefixed in O(m) computations. These properties make the Patricia algorithm a suitable choice for IP forwarding applications which rely on fast matching of IP destination addresses to prefixes, i.e. search keys to node keys.

A data structure constructed according to the Patricia algorithm has a limitation in that node keys stored in the data structure cannot prefix one another.

Various attempts have been made to tackle this limitation, for example United States patent U.S. Pat. No. 6,396,842 B1 describes a method of searching utilising a longest match based radix search trie with variable length keys and having the ability to handle keys which are prefixes of other keys. The method is based on the Patricia algorithm. The address prefixes representing the keys for the tree are modified before being processed by the algorithm. A single byte is added to the beginning of each address prefix which is set equal to the length of the address prefix. The combined address length byte followed by the address prefix is used by the Patricia algorithm. When one address is the prefix of another, the added byte will make both addresses unique and distinct from each other. A Patricia algorithm can be used to search the trie since the node keys have been made unique. In tackling the key prefix limitation of Patricia, performance is degraded as this method requires increased memory capacity and also requires additional searches for different prefix lengths.

Other attempts to tackle the key prefix limitation of tree data structures, such as those constructed according to the Patricia algorithm, destroy desirable properties of the tree data structures, for example requiring frequent inspection of node keys as the tree is traversed.

It would therefore be desirable to provide an improved solution to overcome the node key prefix limitation of algorithms for processing data in tree data structures similar to the Patricia algorithm.

SUMMARY OF CERTAIN INVENTIVE ASPECTS

In accordance with a first aspect of the presently disclosed embodiments, there is provided a method of searching a database using a search key, the database containing data stored in a tree structure, the tree structure including a plurality of nodes, a node having associated data comprising one or more node pointers, the node pointers comprising data identifying nodes which may be traversed when searching the tree structure; a node key; and a search key part identifier identifying a search key part to be used to determine a node pointer to be used when traversing a node, wherein the method comprises: storing in the database first associated data relating to a first node and second associated data relating to a second node, the first associated data including a first node key and the second associated data including a second node key which is prefixed by the first node key; and searching the tree structure using a search key, wherein searching using the search key involves the second node being traversed, and if the first node key has a prefix which matches the search key, the first node being identified subsequent to traversal of the second node.

Hence, the embodiments of the present invention allow searching of data in a database where one or more nodes stored in the database have associated node keys which are prefixes of node keys associated with other nodes stored in the database. These embodiments thus allow a wider range of node keys to be represented in the database.

If a search of the database involves traversing a first node whose node key prefixes the node key of a second node, these embodiment allow identification of the first node subsequently to traversal of the second node. This may involve comparing the node key of an identified node with a search key in order to determine whether there is an exact match, a prefix match, or no match between the identified node key and the search key.

Embodiments of the presently disclosed invention may typically require storage of two node pointers and data identifying a part of the search key to be used when traversing the node, i.e. a search key part identifier. Limited access to node keys is required during searching of the database and the search speed is advantageously independent of search key length. No node keys need be stored in the tree structure itself Instead a node key may be stored elsewhere, and for example associated with its node by a pointer. Alternatively, this may be implemented by embedding the node and its node key in a common data structure so that their association is determined by their relative fixed position in memory. Such an implementation would then require no pointer between the node and its node key.

Preferably, third data indicating that said second node key is prefixed by said first node key is stored. Hence, if comparison of the second node key with the search key results in no match, the first node whose node key prefixes the search key may be identified.

In one embodiment, this may be achieved by storing data associated with a node pointer pointing from the second node to the first node and following this node pointer in order to traverse the tree structure from the second node to the first node. Hence nodes whose node keys are prefixes of each other may be identified and traversed using such node pointers.

Alternatively, this may be achieved by traversing one or more nodes above the first node in the tree structure after the traversal to the second node, but prior to the subsequent traversal to the first node. Hence, all or part of the tree structure may be searched an additional time, but the additional search may finish during traversal of the first node instead of continuing on to traverse the second node.

Further alternatively, this may be achieved by, during traversal of the tree, making note of one or more nodes whose search key part identifiers match those of their parents, i.e. by keeping track of which nodes have potential prefix matching node keys.

Preferably, a particular node's search key part identifier relates to a search key bit to be used to determine a node pointer to be used when traversing the particular node. Hence, instead of having to inspect the node key of each individual node when traversing the node, only its search key part identifier need be inspected in order to determine which node to traverse next. This gives increased efficiency in terms of computational complexity associated with searching the tree structure.

In one embodiment, a particular node's search key part identifier relates to a relative location of a search key bit to be used compared to a previously used search key bit. Hence, a node's search key part identifier may be relative to one or more previously traversed nodes.

Alternatively, a particular node's search key part identifier may relate to an absolute location of a search key bit to be used. This can help to reduce the amount of processing required during traversal of a node, for example reducing the number of search key and node key bits that need be compared. Preferably, inspection of a search key part identifier allows determination of a node pointer's type, i.e. whether a pointer from a particular node is an ancestor pointer or a child pointer, by checking whether a node referenced by a pointer has a lower search key part identifier. This can help avoid the need for flags or suchlike indicating node pointer types.

Preferably, data parameters are stored in association with one or more nodes in said plurality. Hence, information can be associated with each data node in the form of a stored data parameter. Such stored data parameters can be viewed as a payload associated with the tree structure. An end-result result of a search of the tree structure may include accessing and subsequent outputting of a stored data parameter. In an IP routing implementation, such stored data parameters may include routing or forwarding information associated with a route, network entity, network address, or part of a network, etc.

Preferably, searching of the database comprises searching using an algorithm which is substantially similar to the Patricia algorithm, which provides efficient search capabilities.

In accordance with a second aspect of the presently disclosed embodiments, there is provided a method of storing data in a database, the database containing data stored in a tree structure, the tree structure including a plurality of nodes, a node having associated data comprising: one or more node pointers, the node pointers comprising data identifying nodes which may be traversed when searching the tree structure; a node key; a search key part identifier identifying a search key part to be used to determine a node pointer to be used when traversing a node, wherein the method comprises inserting a new node into the tree structure, the new node having an associated node key, the inserting comprising: searching the database using an insertion search key, the insertion search key comprising the new node key, the searching using the insertion search key identifying a given node in the tree structure whose node key has a given prefix relationship with the insertion search key; inserting the first new node into the tree structure in a proximate relationship to the given identified node; and allocating to the first new node: one or more node pointers, a node key equal to the insertion search key, a search key part identifier equal to the search key part identifier of the node above the first new node in said tree.

Hence, embodiments of the present invention allow storing of data in a database where some nodes stored in the database have associated node keys which are prefixes of node keys associated with other nodes stored in the database. The certain embodiment may allow a wider range of node keys to be represented in the database.

A new node added to the database may be allocated a search key part identifier that is equal to the search key part identifier of a node immediately above the new node in the tree structure. This means that a new node may be skipped-over during subsequent searching of the tree structure, helping to further speed-up such subsequent searching.

Preferably, the given prefix relationship comprises the node key of said given identified node being prefixed by said insertion search key. Such a situation could for example occur if the tree structure contains a node with an associated node key 000 and the database is searched using a search key 00 corresponding to the node key of a node to be added to the tree structure.

Preferably, the proximate relationship comprises said new node being inserted above said given identified node in said tree. Hence a new node whose node key prefixes the node key of an existing node may be added above the existing node in the tree. The new node may be inserted immediately above the given identified node in the tree structure, or further above the given identified node in the tree structure.

Preferably, a node pointer that previously pointed to said given identified node is adjusted to point to said new node.

Preferably, a node pointer is created pointing from said new node to said given identified node.

Preferably, the given prefix relationship comprises the node key of said given identified node key being a prefix of said insertion search key. Such a situation could for example occur if the tree structure contains a node with an associated node key 00 and the database is searched using a search key 000 corresponding to the node key of a node to be added to the tree structure.

Preferably, the proximate relationship comprises said new node being inserted below said given identified node in said tree. Hence, a new node whose associated node key is prefixed by the node key associated with an existing node may be added below the existing node in the tree.

Preferably, a node pointer that previously pointed from said given identified node is adjusted to point to said new node.

Preferably, a node pointer is created pointing from said new node to a node below said new node in said tree.

Preferably, a node pointer is created pointing from said new node to a node above said new node in said tree whose node key prefixes the node key of said new node. Hence, embodiments of the invention may allow traversal between nodes whose associated node keys prefix each other.

Preferably, the pointer created pointing to a node above said new node in said tree, points to a node whose node key has the longest matching prefix to the node key of said new node of nodes above said new node in said tree. Hence, the node with the next longest matching prefix of a search key can be identified. This can be useful, for example in an IP routing application when there has been an error or failure associated with the longest matching prefix, for example a broken or overloaded communication link.

Preferably, a pointer pointing from said new node is adjusted to point to a root node, said root node having an empty node key. The tree structure may contain a root node located at the top of the tree. The root node may have an associated empty node key which prefixes all node keys in the tree. Hence, at least one pointer from a new node inserted into the tree structure may point upwards to the root node.

Preferably, the new node is removed from said tree structure by reversing one or more of the steps involved in inserting said new node into said tree structure. Hence, if there is no longer a need to store data associated with a node, the node may be removed from the tree and the relevant node pointers removed and adjusted accordingly.

If no further nodes are added to the tree structure after a new node is added, the removal process may be reversible such that exactly the same steps used to insert the new node may be taken in reverse. However, if further nodes are added to the tree structure after the new node has been added, then removing the new node may involve steps which differ from those used previously to add the node.

In an IP routing scenario, this may correspond to a situation where a network node represented by a node in the tree structure may no longer be contactable via a particular IP address. In such a case, the node in the tree may be removed completely from the tree structure. Alternatively, data associated with the node in the tree may be amended to reflect new contact details for the node.

In accordance with a third aspect of the presently disclosed embodiments, there is provided a method of data packet routing in a data communications network, the method comprising:

receiving routing data associated with a route in the data communications network;

searching a data packet routing database using a search key associated with the received routing data, the searching of the data packet routing database according to the first aspect of the present invention; and on the basis of the searching of the data packet routing database, storing data associated with the route in said data packet routing database.

This aspect of the invention applies the method of the first aspect of the invention to data packet routing in a data communications network. The network may be an Internet which operates according to an Internet Protocol. Here the database may contain data packet routing information for a number of routes in a data communications network and associated node keys may be associated with network addresses.

In embodiments of the present invention, the network entity may be a route in said network and said storing of data comprises inserting a new node into said data packet routing database corresponding to said route.

Addition of a new node to the database may for example occur in response to a new route, network entity or subnet becoming contactable whose network address is prefixed by or is a prefix of a node key associated with a node already in the forwarding database.

In other embodiments of the present invention, the route may be an existing route in said network and said storing of data comprises amending data in said data packet routing database associated with said existing route. The amended data may comprise one or more node keys or search key part identifiers associated with one or more routes, nodes or entities represented in the database.

Alternatively, contact details for an existing route may change such that its new network address is prefixed by or is a prefix of a node key associated with a node already in the routing database. Data associated with a node may be deleted completely from the tree structure or amended to reflect a new address.

Hence, network address data corresponding to a new or existing route in the network may be received at a network entity such as an IP router. The router may include a routing table implemented in a tree structure containing node keys which are prefixes of each other. In order to update the routing database in view of the new or existing route, the tree structure may be searched for node keys corresponding to a network address of the route or other such contact information associated with the route. If a tree node with an exactly matching or prefix matching node key is found, data associated with the node may be inspected and updated to reflect different routing information for the route, or a new node inserted to represent new routing information for the route.

Embodiments disclosed herein thus allow for routing with prefix matching to network addresses where no exact network address match exists in a routing database. One aspect of the invention allows routing even when a network address has a prefix relationship with one or more node keys corresponding to other routes. Data packet routing protocols such as the Border Gateway Protocol (BGP) rely on the selection and advertisement of network address prefixes, so certain embodiments may be suitably applied to networks such as the Internet where prefix matching is implemented.

Preferably, forwarding information and/or route data associated with said route are output to a data packet forwarding table. Hence, new or updated routing information for a route may be used to populate a data packet forwarding table.

Preferably, said data identified in said forwarding table comprises network address data.

Preferably the network address data and/or the destination address data comprise Internet Protocol (IP) address data. Hence, routing for network entities with network address containing IP address data may be carried out using the embodiments of the invention. Also, data packets containing IP address data may be forwarded to their destinations using embodiments of the invention.

In accordance with a fourth aspect of the present invention, there is provided apparatus adapted to perform the method of the first, second and third aspects of the present invention.

In accordance with a fifth aspect of the present invention, there is provided computer software adapted to perform the method of the first, second and third aspects of the present invention.

In accordance with an additional aspect, there is provided a computer-readable medium with computer-executable instructions stored thereon, which, when executed cause a processor of a computing device to perform a method of searching a database using a search key.

In accordance with an additional aspect, there is provided a computer-readable medium with computer-executable instructions stored thereon, which, when executed cause a processor of a computing device to perform a method of data packet routing in a data communications network.

Further features and advantages will become apparent from the following disclosed embodiments, given by way of example only, which is made with reference to the accompanying drawings.

DETAILED DESCRIPTION OF THE CERTAIN INVENTIVE EMBODIMENTS

Figure 1:
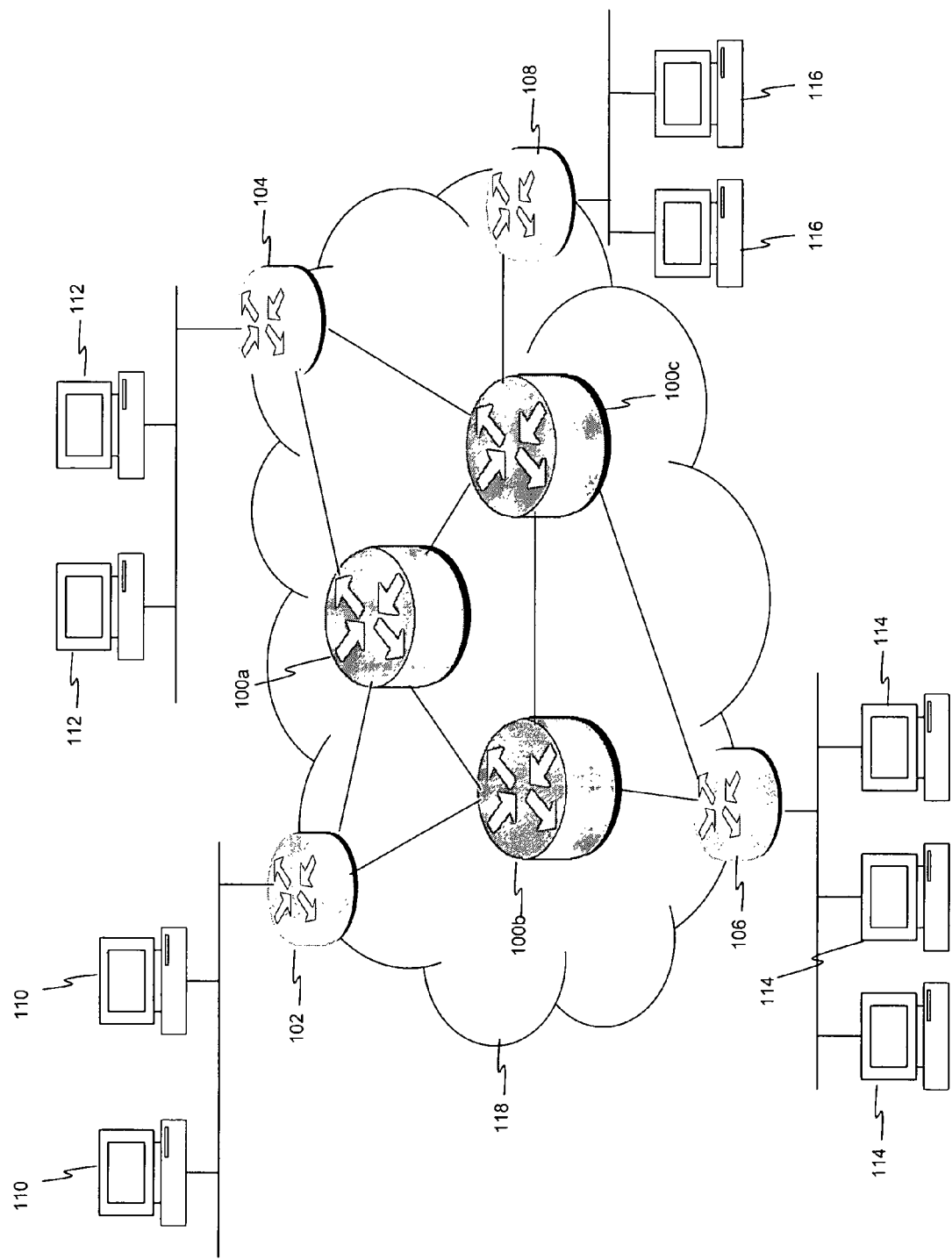
FIG. 1 shows a system diagram of a data communications network according to an embodiment of the present invention.

FIG. 1 shows a system diagram of a data communications network according to an embodiment of the present invention. The network comprises a routing network 118 including a number of interconnected core routers 100a, 100b, 100c and edge routers 102, 104, 106, 108. Core routers 100a, 100b, 100c form the main connection links (backbone) of routing network 118 and specialise in the transfer of large data volumes over the network. Edge routers 102, 104, 106, 108 route data packets between respective local area networks 110, 112, 114, 116 and the backbone network formed by core routers 100a, 100b, 100c.

Figure 2:
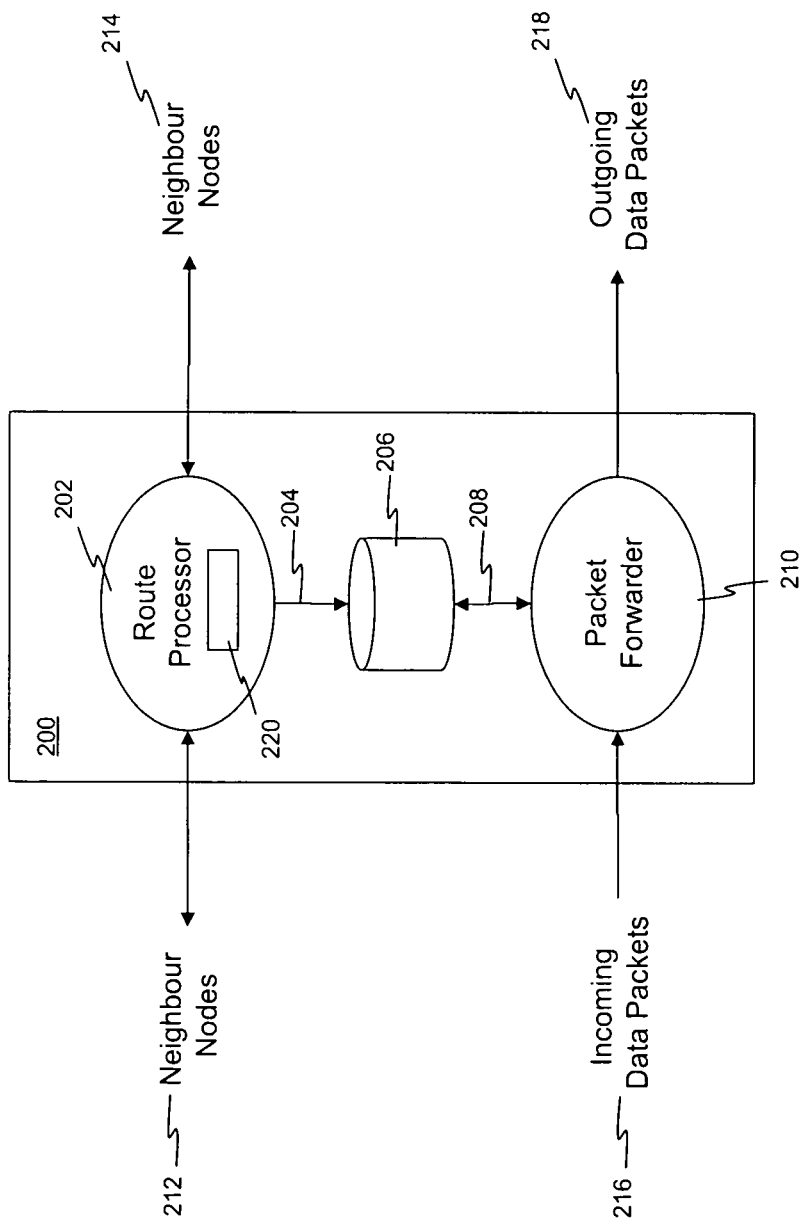
FIG. 2 shows the architecture of an IP router according to an embodiment of the present invention.

FIG. 2 shows the architecture of an IP router 200 according to an embodiment of the present invention. The router 200 is connected to a number of neighbouring nodes 212, 214, for example as shown in FIG. 1. Router 200 includes a route processor 202 responsible for learning the network's topology in terms of routes between various parts of or entities located in the network. Route processor 202 interfaces with neighbouring nodes 212, 214 in order to construct and maintain routing table 220. Routing table 220 may be in the form of a tree structure database. Route processor 202 stores routing information relating to various routes and routing protocols in routing table 220. Route processor 202 is also responsible for providing route computation and updates 204 by outputting forwarding information and/or network address data to forwarding table 206.

Router 200 also includes a packet forwarder 210 responsible for receiving incoming data packets 216 and transmitting outgoing data packets 218. When router 200 receives a data packet, destination IP address data is read from the data packet and used in a search of forwarding table 206. This search 208 involves searching forwarding table 206 for the IP destination address data of the data packet in order to determine corresponding forwarding information. The forwarding information may contain an output port of router 200 to which to direct the data packet and the next hop, i.e. which neighbouring node, to transmit the packet on to.

Figure 3:
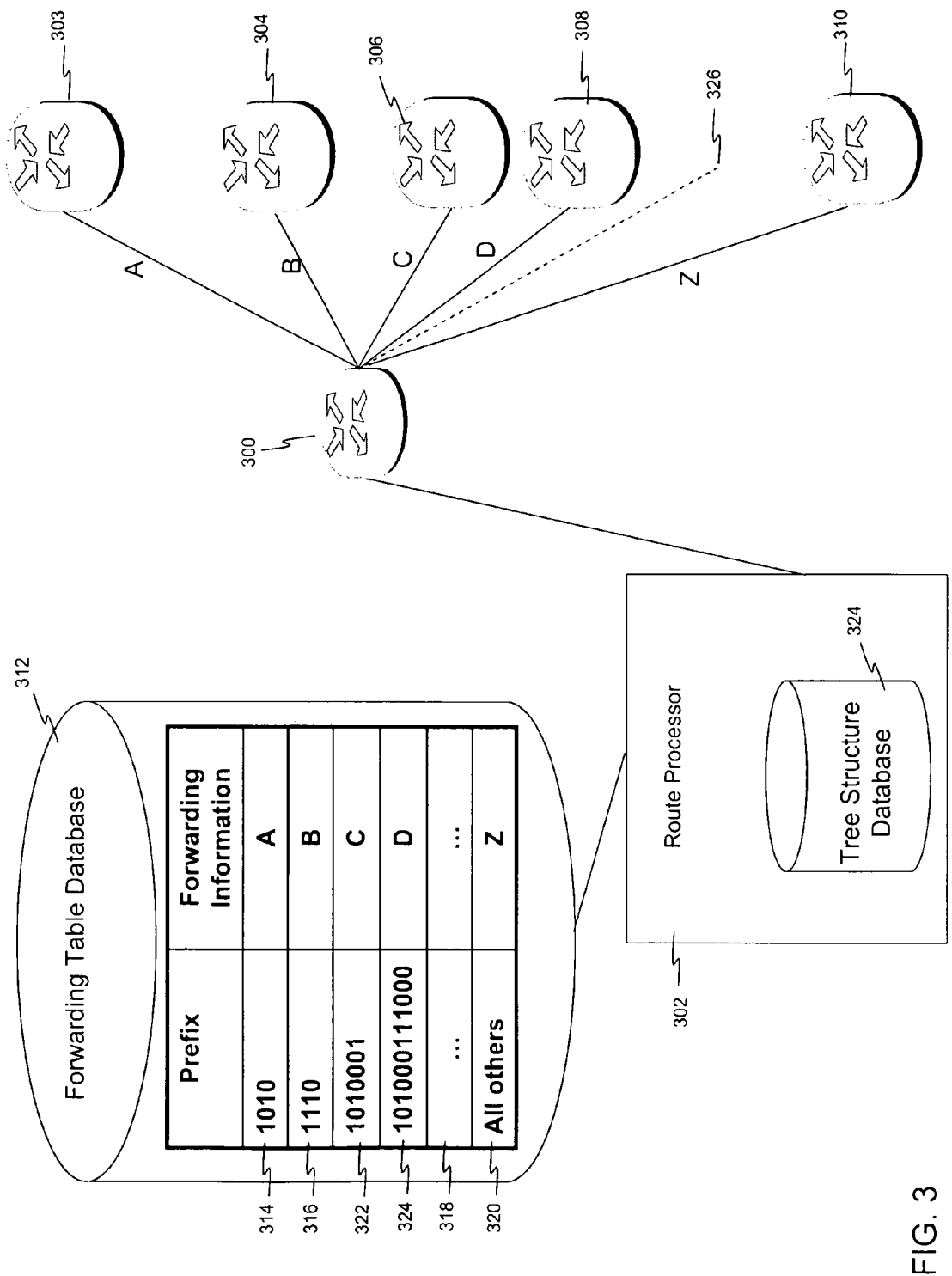
FIG. 3 shows an exemplary forwarding table for a router according to an embodiment of the present invention.

FIG. 3 shows an exemplary forwarding table 312 for a router 200, 300 according to an embodiment of the present invention. FIG. 3 depicts router 300 being interconnected to routers 303, 304, 306, 308 and 310. In reality, router 300 may be connected to many more other routers 326 and other such network devices.

Router 300 includes a route processor 302 which contains a routing table, for example in the form of a tree structure database 324. Router 300 also includes a forwarding table database 312 connected to route processor 302 Route processor 302 represents and keeps track of the network topology around router 300 using a tree structure stored in the tree structure database. Route processor 302 processes the tree structure and outputs new routes and route updates to forwarding table database 312. Note that route processor 302 may not necessarily output data to forwarding table database 312 every time a new route is added to or a route is amended in tree structure database 324. The tree structure and forwarding table databases may exist as separate entities or alternatively a combined database entity. Likewise the route processor and packet forwarder may be separate entities or combined into a single entity.

Tree structure database 324 includes data relating to the tree structure in which the routing table database data is stored. This may include data associated with a plurality of nodes, each of the nodes having one or more node pointers, an associated node key, and a search key part identifier.

A node pointer may include data associated with nodes that may be traversed when the tree structure is being searched, for example a node located above or below the node in the tree structure.

A search key part identifier may include data identifying a search key part which may be used to determine a node pointer to be used when traversing the node. Search key part identifiers are discussed in more detail below.

Forwarding table database 312 may be used to store data output by route processor 302 relating to a number of prefixes and associated forwarding information for each of the prefixes. The first column of forwarding table 312 includes the prefixes "1010", "1110", "1010001", and "101000111000", shown as items 314, 316, 322, 324 respectively. The default prefix 320 serves as a 'catch all' for all prefixes other than "1010", "1110", "1010001", and "101000111000". Item 318 shows that in practice, many more prefixes and associated forwarding information may be contained in forwarding table 312.

Note that these prefixes have been given in purely binary bit notation for explanatory purposes. In IPv4, addresses consist of 32 bits, which may be represented by four decimal numbers separated by decimal points, with each decimal number representing eight bits of a 32 bit IP address as discussed previously above. In IPv6, addresses consist of 128 bits which may be represented as eight hexadecimal 16-bit numbers separated by colons. The following binary examples are abstract and can correspond with any IP addressing scheme.

The second column of forwarding table 312 includes forwarding information for the prefixes listed in the forwarding table, i.e. where a data packet should be forwarded to according to the longest prefix match for the data packet's IP destination address. Some forwarding examples are now given: a data packet whose IP destination address has first 12 bits equal to "010111101010" has longest prefix match "1010", so should be forwarded using forwarding information A to router 302; a data packet whose IP destination address has first 12 bits equal to "111000100110" has longest prefix match "1110", so should be forwarded using forwarding information B to router 304; a data packet whose IP destination address has first 12 bits equal to "101000100110" has longest prefix match "1010001", so should be forwarded using forwarding information C to router 306; a data packet whose IP destination address has first 12 bits equal to "101000111000" has longest prefix match "101000111000, so will be forwarded using forwarding information D to router 308; a data packet whose IP destination address has first 12 bits equal to "111100111100" has no matching prefix in the forwarding table, so will be forwarded using the default forwarding information Z to router 310.

The IP destination data used to search the routing table may be referred to as the search key and the prefixes at each of the nodes may be referred to as node keys.

As mentioned above, algorithms such as the Patricia algorithm allow for quick determination of whether a search key is stored in a tree structure. Such algorithms with corresponding tree structures are thus particularly suited to IP routing applications. However, prior art systems have the drawback that prefixes stored in the data structure cannot prefix one another and previous attempts to alleviate this problem may destroy the algorithm's efficient lookup properties, such as requiring inspection of keys at certain nodes during tree traversal.

Prior art systems are thus not suited to using such algorithms and associated tree structures to store all the prefixes in the exemplary forwarding table 312 shown in FIG. 3. This is due to the fact that although "1010" and "1110" are not prefixes of each other, "1010" prefixes both "1010001" and "101000111000", and also because "1010001" prefixes "101000111000". Prior art systems, would thus be limited to storing just one of the prefixes "1010", "1010001" and "101000111000" in the router's forwarding table if they were to employ the efficient search properties of algorithms such as Patricia.

Embodiments of the present invention may overcome the prefix limitation of algorithms such as the Patricia algorithm and associated tree structures without compromising their efficient search properties and without necessarily increasing the required data storage.

To illustrate this, the Patricia algorithm and associated tree structure are now described below in more detail, along with a description of how certain embodiments of the present invention are able to accommodate node keys which prefix one another.

Digital trees are traversed by inspecting only the search key and not by direct comparison with the keys at the nodes. In a tree structure according to an embodiment of the invention, each node may contain a search key part identifier, and one or more node pointers.

The node pointers may be pointers to left (typically associated with a binary zero) or right (typically associated with a binary one) nodes to look at next when traversing the node.

A search key part identifier may identify a search key part which may be used to determine a node pointer to be used when traversing the node. The search key part identifier may include a relative or absolute location of one or more bits in the search key or a number of bits in the search key that may be skipped when traversing the node.

A relative number of bits may for example be relative to a bit used to traverse a node above the relevant node, or a previously traversed node.

A search key part identifier thus indicates how many bits may be skipped, i.e. which bit of the search key should be examined, in order to determine the pointer to follow from the node when traversing the tree using a particular search key.

Use of a search key part identifier means that some search key bits may be skipped, i.e. ignored, during a search, so when a node is identified as a result of a search, a one-off comparison with the node key is required to check the match. A search may thus succeed or fail on the result of a comparison of a node key with a search key.

It is possible to visit the same node twice during the same search procedure. This results from a combination of:

(i) not comparing the search key with nodes that are passed, and (ii) skipping over search key bits that do not discriminate between nodes in the tree.

If ever an upward step in the tree occurs, or a step to the same node occurs, it is usually the last step in a search procedure. An upward step may for example involve following a node pointer that points from the node currently being traversed to a node above that node in the tree (commonly referred to as an ancestor pointer). A step to the same node may for example involve following a pointer from the node currently being traversed to the same node in the tree (commonly referred to as a self-pointer).

Figure 4:
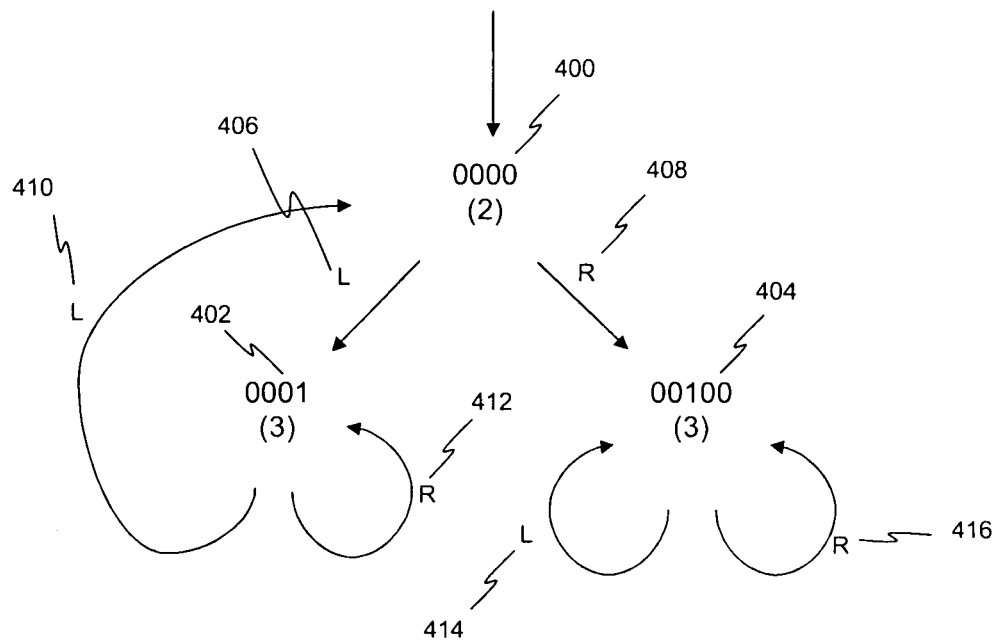
FIG. 4 shows an example of a tree structure according an embodiment of the present invention.

An example depiction of a tree structure according to an embodiment of the invention is shown in FIG. 4. The tree contains three nodes, shown by items 400, 402 and 404. In an IP routing application, each node key may correspond to a destination address prefix (for example as shown in the first column of forwarding database 312 in FIG. 3) and each node could have an associated stored data parameter relating to forwarding information for that destination address prefix (for example as shown in the second column of forwarding database 312 in FIG. 3). The structure of the tree shown in FIG. 4 may be stored in a tree structure database (for example as shown by item 324 in FIG. 3).

The three nodes in FIG. 4 are shown with their node keys in binary notation, being 0000, 0001 and 00100 respectively. Each of the nodes has an associated search key part identifier, denoted in FIG. 4 as the values in brackets at each node. The node with a node key of 0000 has a search key part identifier of 2, the node with a node key of 0001 has a search key part identifier of 3, and the node with a node key of 00100 has a search key part identifier of 3. The search key part identifier for a node here denotes the absolute number of bits of the search key that should be skipped in order to determine which node pointer to follow when traversing the node.

It should be noted that the nodes keys need not be, and are typically not, stored at the nodes themselves. Another way to view the search key part identifier is that it can also be used to distinguish between nodes in the tree below the node being traversed, i.e. the search key part identifier denotes which bit in the node keys of the nodes below the node being traversed should be examined in order to distinguish between those node keys. So, for example, node 400 in FIG. 4 with node key 0000, has a search key part identifier 2. This means that bit 2 (which is the third bit counting from the left-hand side after bit 0 and bit 1) distinguishes between the node keys of node 402 with search key part identifier 0001 and node 404 with search key part identifier 00100. In this case, bit 2 of node 402 node's key is a binary zero and bit 2 of node 404 node's key is a binary one.

The tree starts at root node 400 with a node key of 0000 and a search key part identifier of 2. The left pointer in node 400 corresponding to a binary zero, shown by item 406 is a child pointer as it points from node 400 to its left child node 402. The left pointer in node 402, shown by item 410, is an ancestor pointer as it points from node 402 back to an ancestor node 400. The right pointer in node 402, shown by item 412, is a self pointer as it points from node 402 to the same node 402. The right pointer in node 400, shown by item 408, is a child pointer as it points from node 400 to its right child node 404. The left pointer in node 404, shown by item 414, is a self pointer as it points from node 404 to the same node 404. The right pointer in node 404, shown by item 416, is a self pointer as it points from node 404 to the same node 404.

The tree can be searched using a search key in order to check whether the tree contains a node key corresponding to the search key. The search process, which begins at the root node, is now described for a number of different search keys. A zero in the search key corresponds to a left branch, i.e. follow the left pointer, and a one in the search key corresponds to a right branch, i.e. follow the right pointer. A search ends when a pointer to a node upwards in the tree or a self pointer is followed, or a search key part identifier of a traversed node indicates a bit that is beyond the end of the search key in question.

Example search key: k=00100:

Bit 0 of the search key is on the left hand side of the search key (a zero), followed by the bit 1 (a zero), bit 2 (a one), bit 3 (a zero) and bit 4 (a zero), with a total of five bits.

The search process starts by traversing node 400. The search key part identifier of this node is 2, so bit 2 of the search key should be inspected first. Bit 2 of the lookup key is a 1, so the search branches right from there along right pointer 408 in FIG. 4 to traverse node 404. The search key part identifier of node 404 is 3, so bit 3 of the search key should be inspected. Bit 3 of the search key is a zero, so the search branches left from there along the left pointer 414. The search process is still traversing node 404, indicating that a self pointer has been followed, so the search ends here. The search key can now be compared to the node key at the node, which can be seen to be identical (both 00100). This indicates a match, i.e. a successful search, meaning that search key 00100 is contained in the tree.

It should be noted that the actual stored data parameters associated with the nodes may be stored elsewhere and are not required during the traversal process. The stored data parameters may be inspected at the end of a search.

Example lookup key: k=0101:

The search process starts at node 400 with search key part identifier of 2. Bit 2 of the search key is a zero, so the process branches left from there along left pointer 406 to traverse node 402. The search key part identifier of node 402 is 3, so bit 3 of the search key should be inspected. Bit 3 of the search key is a 1, so the process branches right from there along right pointer 412. The search process is still traversing node 402, indicating that a self pointer has been followed, so the search ends here. Comparing the search key with the node key results in a failure as the node key of node 402 is 0001, which is not the same as the search key which is 0101. The search thus provides the information that nothing in the tree prefixes or is prefixed by this search key.

Example search key: k=0000:

The search process starts at node 400 with a search key part identifier of 2. Bit 2 of the search key is a zero, so the search process branches left from there along left pointer 406 to traverse node 402. The search key part identifier of node 402 is 3, so bit 3 of the search key should be inspected. Bit 3 of the search key is a 0, so the process branches left from there along left pointer 410 to traverse node 400. The search process is now at node 400, indicating that a pointer upwards to an ancestor node has been followed, so the search ends here. Comparing the search key with the node key at the node gives a match, i.e. a successful search meaning that search key 0000 is contained in the tree.

Example search key: k=000101010:

The search process starts at node 400 with a search key part identifier of 2. Bit 2 of the search key is a zero, so the process branches left from there along left pointer 406 to traverse node 402. The search key part identifier of node 402 is 3, so bit 3 of the search key should be inspected. Bit 3 of the search key is a 1, so the process branches right from there along right pointer 412 to traverse node 402. The search process is still at node 402, indicating that a self pointer has been followed, so the search ends here. Comparing the search key with the node key at the node, gives a match up to the node length, i.e. the first four bits of the search key match the four bits of the node key at the node identified by the search. There are several bits left over in the search key, i.e. 01010, so this node key is the longest prefix node key contained in the tree for this search key.

Example search key: k=00:

The search process starts at node 400 with a search key part identifier of 2. Bit 2 is past the end of the search key, so the search stops here. Comparing the search key with the node key at the node identified at the end of the search gives a match up to search key length, i.e. the first two bits of the search key match the first two bits of the node key. This means that this node key is prefixed by the search key.

Example search key: k=000:

The search process starts at node 400 with a search key part identifier of 2. Bit 2 of the search key is a zero, so the process branches left from there along left pointer 406 to traverse node 402. The search key part identifier of node 402 is 3, so bit 3 of the search key should be inspected. Bit 3 is past the end of the search key, so the search stops here. Comparing the search key with the node value at the node identified at the end of the search gives a match up to the search key length, i.e. the first three bits of the search key match the first three bits of the node key. This means that this node key is prefixed by the search key.

In the last two search examples (for search keys 00 and 000), the search finds the shortest node key prefixed by the search key. A list of node keys in the tree which are prefixed by the search key can be determined by traversing the subtree, i.e. the node itself and all descendents of that node, of the matched node, including pointers back up to their ancestors (but not the descendents of those ancestors).

For search key 00, it can be seen that the whole tree is prefixed by this search key as nodes 402 and 404 are in the subtree for node 400. For search key 000, it can be seen that the 400 and 402 nodes are prefixed by this search key as node 402 has an ancestor pointer to node 400, but that the remainder of the tree, is not, as node 404 is not in the subtree for node 402.

The example of search key k=0000 demonstrates why ancestor pointers can be important in such tree structures. Node 400 has a search key part identifier of 2 and no self pointers. So, searching using a search key of 0000 (or any search key prefixed by 0000) will result in traversal past this node with the search not ending at that node. A search using this search key returns to find node 400 using the ancestor pointer 410 at node 402.

In general, any node that has no self pointer is the ancestor of a node somewhere in its subtree. A node may have two self pointers, a self and a child, a self and an ancestor, two children, or a child and an ancestor. In the latter two cases, the node must be the ancestor of a descendent within its subtree.

In tree structures constructed according to embodiments of the invention, each node in the tree requires at least one ancestor or self pointer to it. In a tree of n nodes, there are exactly n+1 pointers available to fill this role, however the tree structure is arranged. In fact, there is usually exactly one self pointer that will not be followed during a successful search, and excluding this, each node is pointed at by exactly one of the remaining n ancestor or self pointers.

In the example tree structure of FIG. 4, the right child of node 404 is the pointer that will not be followed during a successful search.

Note the inherent restriction of relatively simple Patricia tree structures such as this, i.e. in that they cannot distinguish between duplicate keys. Attempts to insert a duplicate key into such a tree structure will fail in some manner, the exact nature of the failure being dependent on the particular implementation of the tree structure and associated search algorithm.

Tree structures such as those constructed according to the Patricia algorithm have an inherent restriction, that no node key in the tree may be the prefix of any other node key in the tree.

Prior systems have approached this limitation in a number of approaches, for example:

1) Control the inputs to the tree structure so that prefixed node keys do not occur.

2) Add a singly-linked list below each node whose node key prefixes another node key, and put the prefixed node keys in the singly-linked list instead of the tree.

3) Add a special character or string to the end of each prefix node key inserted.

Each of these approaches either detracts from search performance and/or prefixing capabilities or requires unnecessary additional memory storage capacity.

The presently disclosed embodiments of the invention may extend conventional tree structures such as the Patricia tree structure as described below. The extension does not suffer from the drawbacks described above, whilst allowing nodes with node keys that prefix each other to be stored in the tree and also nodes with node keys that are prefixed by node keys of other nodes in the tree to be inserted into the tree. Further, certain embodiments of the present invention do not detract from the search performance and key prefixing qualities when used with algorithms such as the Patricia algorithm.

If one node key prefixes another, the node with the longer node key is a descendent node of the node with the shorter node key. The node with the shorter node key will be allocated the same search key part identifier as its parent.

The node with the shorter node key is a new type of node referred to herein as a skipped-prefix node. The search key part identifier of a skipped-prefix node matches its parent's, and consequently one of its node pointers is unusable during searching of the tree. That node pointer may be referred to as being 'off' the downward tree. A search of the tree will traverse through the skipped-prefix node to its child, no matter what search key is being looked up, i.e. the skipped-prefix node is always skipped during downward traversal. Multiple such skipped-prefix nodes may be inserted into the tree if multiple prefixing node keys exist, for example if 0, 00, 000 and 0000 need to be represented in the tree.

If an initial search fails, skipped-prefix nodes that have been traversed through during a search may be examined in reverse order to find the longest search key match. To facilitate this, the certain embodiments of the invention may introduce skip-back node pointers which are used to indicate either:

a) the next skipped-prefix node above this one b) the self node if there is no shorter prefix above this one (this condition may only occur at the root node)

A node containing no key, also known as an empty key, may be kept in the tree at a root node, so that the root will be a skipped-prefix node if there are any other nodes in the tree, and the root node will have a search key part identifier of zero. This can help to minimise special case treatment for manipulating the root node.

A node can be identified as a skipped-prefix node if and only if it has a child node and either:
(i) the corresponding node key is empty (this may only occur at the root)
(ii) it inspects the same search key part identifier as its parent.

Figure 5:
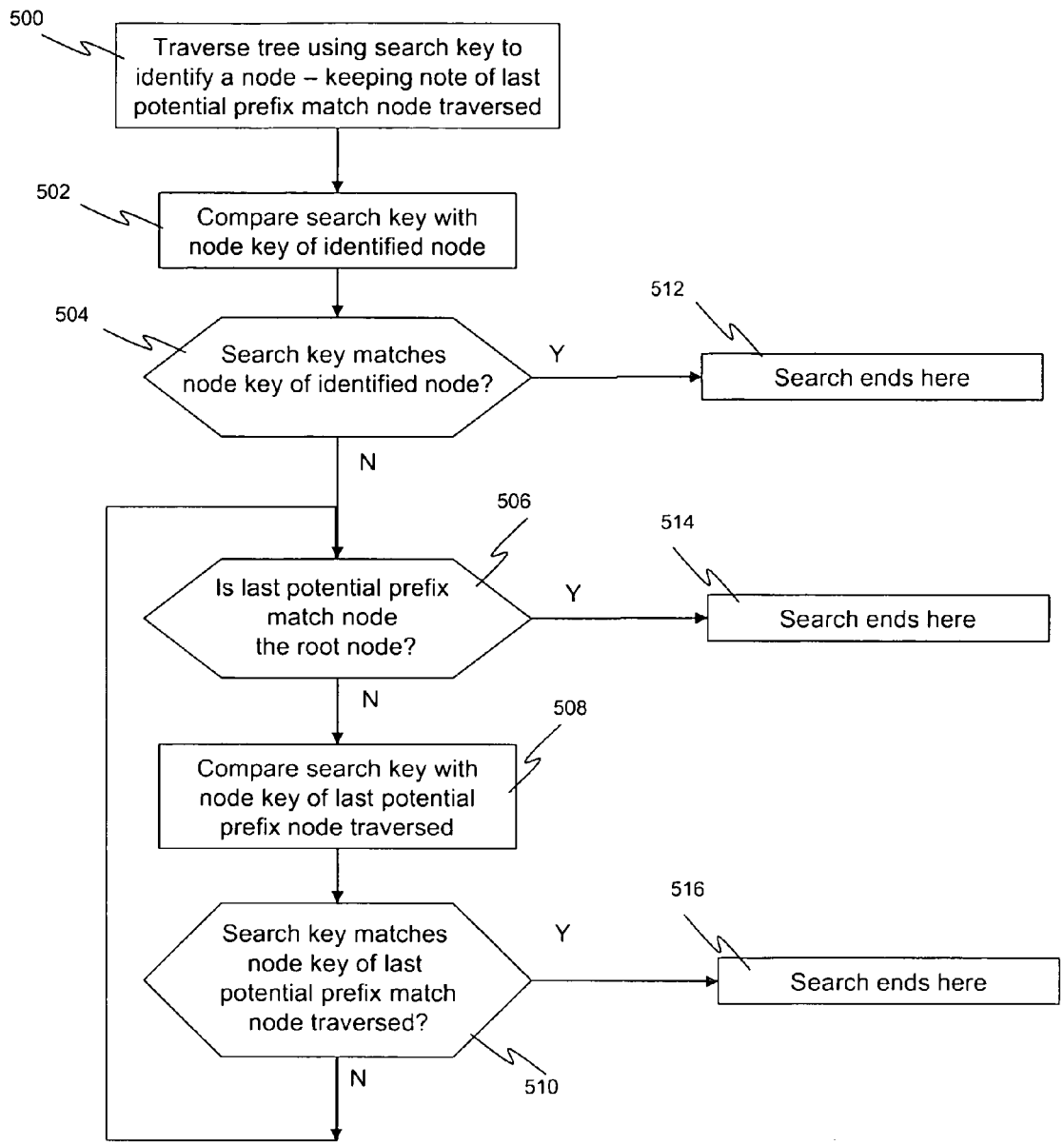
FIG. 5 is a flow chart showing searching of a tree structure according to an embodiment the present invention.

FIG. 5 is a flow chart showing searching of a tree structure according to an embodiment the present invention.

The search process begins at step 500 where nodes in the tree are traversed, as described above using a search key. This will typically begin at a root node located at the top of the tree. The search will identify a node in the tree, either when a self-pointer is followed, a pointer to a node upwards in the tree is followed, or a search key part identifier of a traversed node indicates a bit that is beyond the end of the search key in question.

During traversal, a note is kept of the most recently traversed node whose search key part identifier matches that of its parent node. This information is noted because the most recently traversed node whose search key part identifier matches that of its parent node is a potential prefix matching node. It should be noted that any such potential prefix match is not resolved during traversal of the tree, i.e. node keys of such nodes are not compared to the search key during traversal of the tree. Noting of this information may involve use of a pointer, a flag or any such feature that allows the most recently traversed potential prefix matching node to be identified.

The search key is then compared in step 502 with the node key of the node identified in the search.

If the search key does match the node key of the node identified in the search, see step 504, the search process ends at this node in step 512. The node key of the identified node is a match in the tree structure for the search key.

If the search key does not match the node key of the node identified in the search, see step 504, the search process continues on to step 506.

If the last potential prefix match node is the root node, see step 506, then the search ends at step 514. The node key of the root node may be the longest prefix that exists for the search key. Under the simplifying assumption that the root node key is the empty key, this is always the case.

If the last potential prefix match node is not the root node, see step 506, the search process continues on to step 508.

In step 508, the search key is compared to the node key of the last potential prefix node that was traversed.

If the search key does match the node key of the last potential prefix node that was traversed, see step 510, then the search ends at step 516. The node key of the last potential prefix node that was traversed is a match in the tree structure for the search key.

If the search key does not match the node key of the last potential prefix node that was traversed, see step 510, the search process continues on to repeat steps 506, 508 and 510 as necessary, until either the root node is reached or a match is found to a node key of a potential prefix match node. In this way, nodes with successively shorter node keys will be inspected until a node with a matching prefix node key is reached. If no such node with a matching prefix node key is found, then the root node may be reached as its empty key prefixes all node keys.

Figure 6:
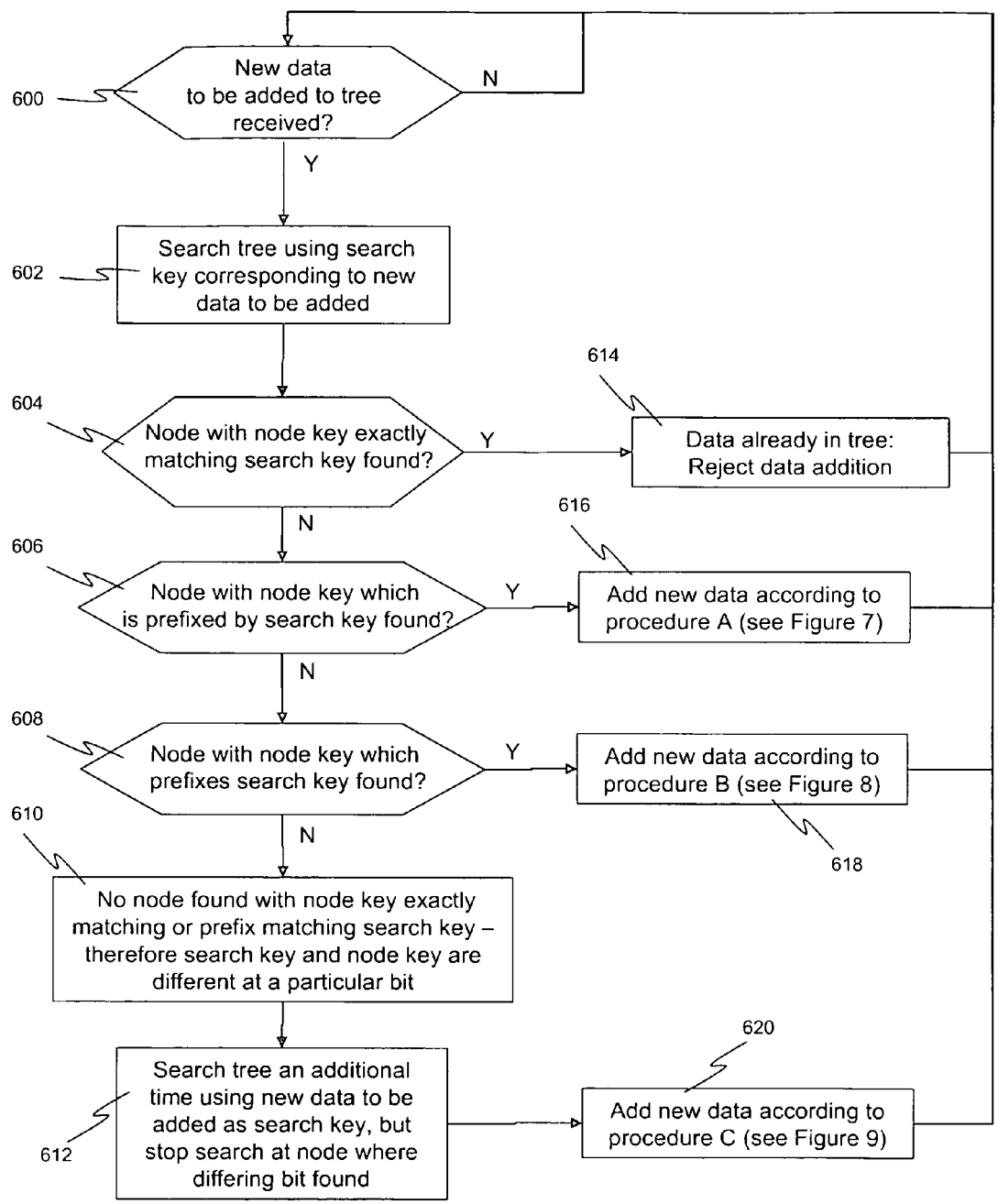
FIG. 6 is a flow chart showing insertion of new data into a tree structure according to an embodiment of the present invention.

FIG. 6 is a flow chart showing insertion of new data into a tree structure according to an embodiment of the present invention.

The process begins in step 600 when new data to be added to the tree is received. The tree is searched using a search key corresponding to the new data to be added in step 602. If the search results in a node with a node key exactly matching the search key being identified, as shown in step 604, then the data is already represented in the tree and the data insertion is rejected in step 614.

Figure 7:
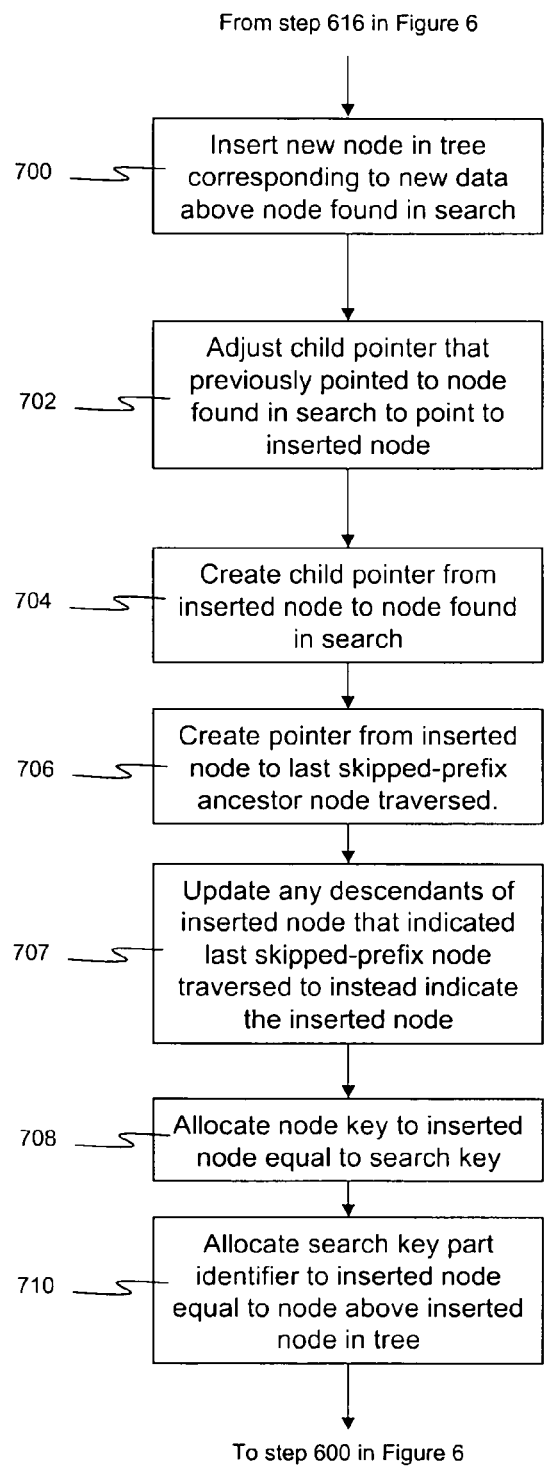
FIG. 7 is a flow chart showing insertion of a node into a tree structure according to an embodiment of the present invention.

If the search results in a node with a node key which is prefixed by the search key being identified, as shown in step 606, then the new data is added to the tree by inserting a new skipped-prefix node according to a Procedure A, as depicted in FIG. 7. Step 700 in FIG. 7 shows that a new skipped-prefix node corresponding to the new data is inserted above the node identified in the search. A child node pointer that previously pointed to the node identified in the search is adjusted in step 702 to point to the new skipped-prefix node. A child node pointer from the new skipped-prefix node is created pointing to the node identified in the search in step 704.

A skip-back node pointer pointing from the new skipped-prefix node to the last skipped-prefix ancestor node traversed is created in step 706. The pointers of any descendants of the inserted node that indicated the last skipped-prefix node traversed are updated to instead indicate the inserted node in step 707.

A node key equal to the search key, i.e. the key to be inserted, is allocated to the new skipped-prefix node in step 708. The new skipped-prefix node is allocated a search key part identifier equal to the search key part identifier of the node above it in the tree in step 710. This completes the node insertion Procedure A for the case where the search identifies a node with a node key which is prefixed by the search key.

Figure 8:
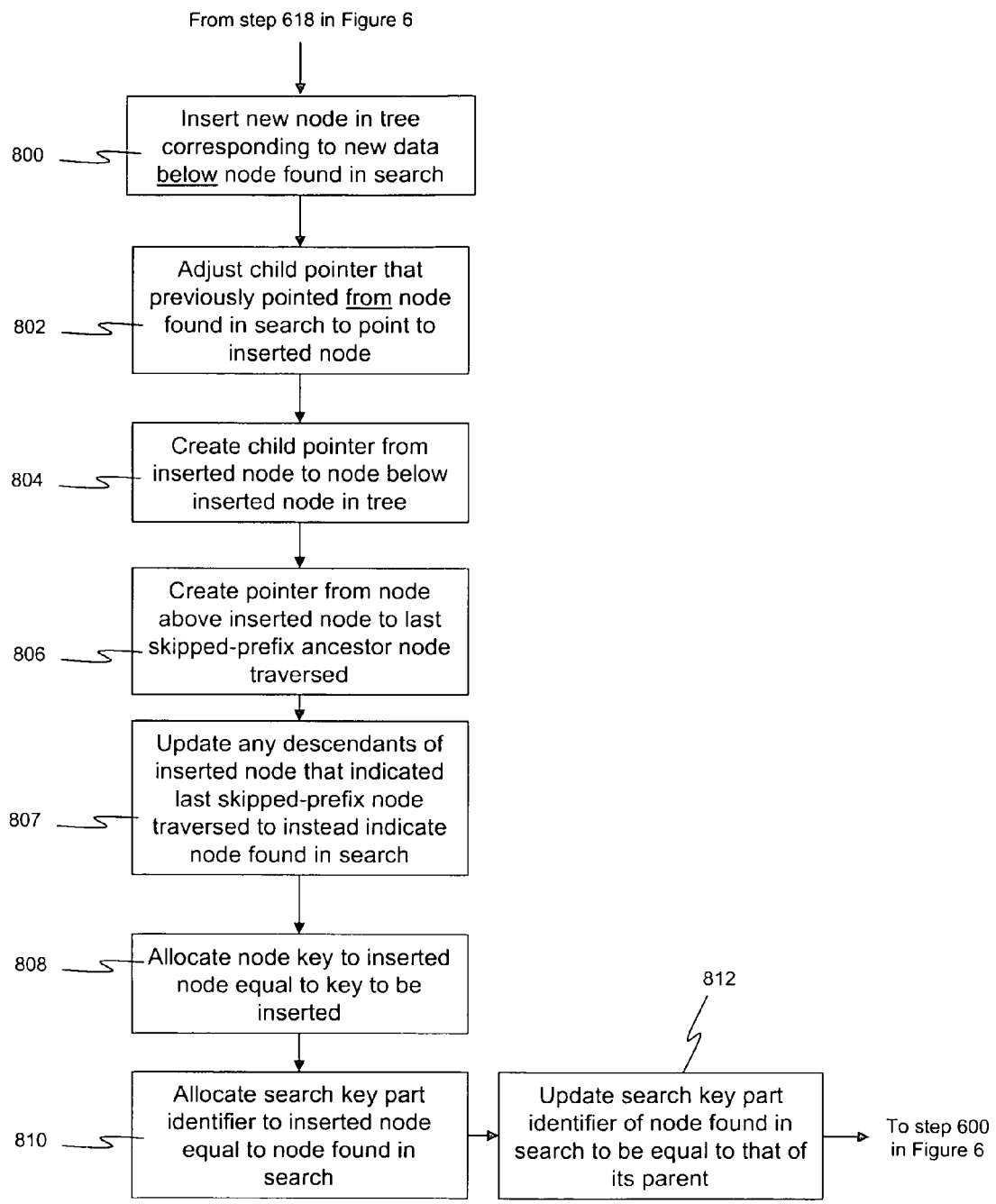
FIG. 8 is a flow chart showing insertion of a node into a tree structure according to an embodiment of the present invention.

If the search results in a node with a node key which prefixes the search key being identified, as shown in step 608, then the new data is added to the tree by inserting a new non-skipped-prefix node and updating the node identified in the search to be a skipped-prefix node according to a procedure B, as depicted in FIG. 8. Step 800 in FIG. 8 shows that a new node corresponding to the new data is inserted below the node identified in the search. A child node pointer that previously pointed from the node identified in the search is adjusted in step 802 to point to the new node. A child node pointer from the new node is created pointing to the node below it in step 804.

As the node key of the node above the newly inserted node prefixes the node key of the newly inserted node, the node above is updated to be a skipped-prefix node. A skip-back node pointer pointing from the newly updated skipped-prefix node to the last skipped-prefix ancestor node traversed during insertion is created in step 806. Any descendants of the inserted node that indicated that ancestor are changed to instead indicate the newly updated skipped-prefix node in step 807.

A node key equal to the search key, i.e. the key to be inserted, is allocated to the newly inserted node in step 808. The newly inserted node is allocated a search key part identifier equal to the search key part identifier of the node above it in the tree in step 810, that is the former search key part identifier of the newly-updated skipped-prefix node. The newly updated skipped-prefix node is then allocated a search key part identifier equal to the search key part identifier of the node above it in the tree in step 812. This completes the node insertion Procedure B for the case where the search identifies a node with a node key which prefixes the search key.

Figure 9:
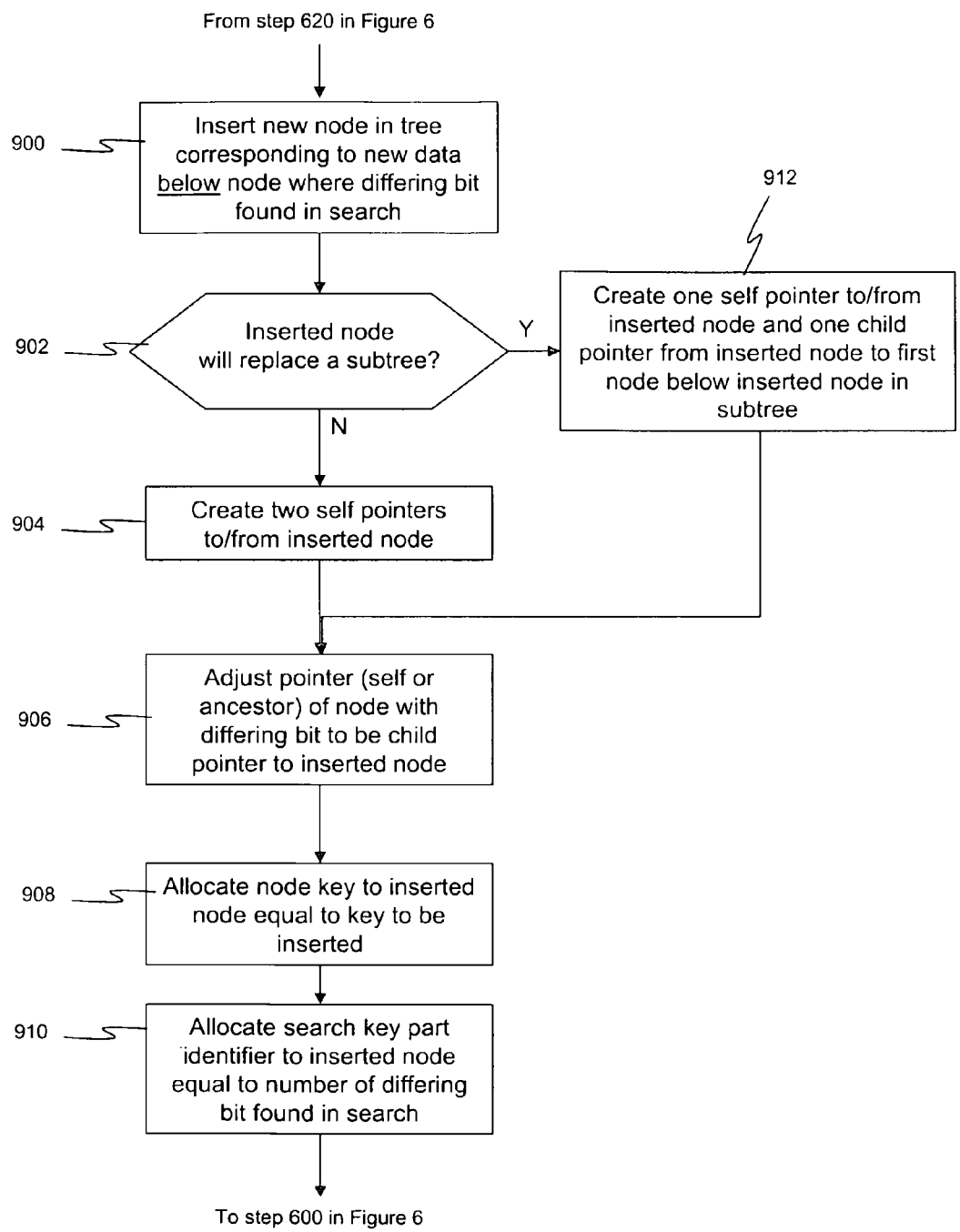
FIG. 9 is a flow chart showing insertion of a node into a tree structure according to an embodiment of the present invention.

If the search results in a node being identified whose node key does not exactly match or prefix match the search key, then the node key of the identified node and the search key differ at a particular bit. In this case, the tree may be searched an additional time, but this time stopping the search at the node with the differing bit, as shown in step 612. The new data is added 620 to the tree by inserting a new node according to a procedure C, as depicted in FIG. 9. Note that in this case the new node is not a skipped-prefix node.

Step 900 in FIG. 9 shows that a new node corresponding to the new data is inserted below the node having a node key with a differing bit to the search key.

If the new node has a subtree, i.e. insertion of the new node will replace a subtree, then a self pointer to/from the inserted node is created in step 912. Step 912 also includes creating a child node pointer from the inserted node to the first node below the new node in its subtree.

If insertion of the node will not replace an existing subtree, then two self pointers to/from the inserted node are created in step 904.

In step 906, a node pointer (may be an ancestor pointer or a self pointer) of the node having a node key with a differing bit to the search key is adjusted to be a child node pointer pointing from the node with the differing node key bit, to the inserted node.

A node key equal to the search key is allocated to the new node in step 908. The new node is allocated a search key part identifier equal to the bit number of the differing bit in step 910. This completes the node insertion Procedure C for the case where the search identifies a node with a node key which does not exactly match or prefix match the search key.

In an alternative embodiment, step 612 data may be replaced by storing during the initial search process, data which identifies the node whose node key differs from the search key at a particular bit. This data could then be used to traverse to the node with the differing bit, without having to conduct an additional search of the tree.

Creation of an exemplary tree structure using the extension of at least one embodiment of the present invention is now described with reference to FIGS. 10 to 16.

Figure 10:
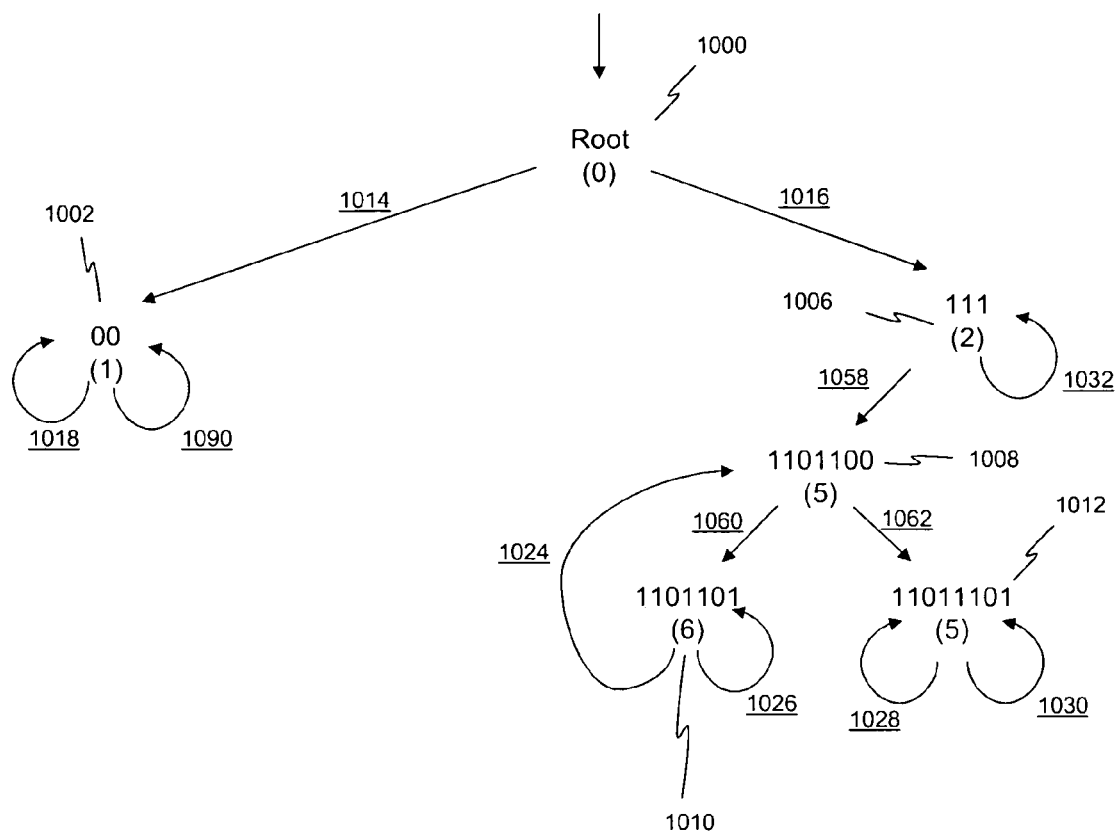
FIG. 10 is a diagram showing a tree structure according to an embodiment of the present invention.

FIG. 10 shows a tree structure according to an embodiment of the present invention.

The tree structure consists of a root node 1000 with an empty node key and search key part identifier of zero (shown in brackets). Again, it should be noted that the node keys associated with each node have been included in the diagram at each node for explanatory purposes. The node keys themselves will typically be stored elsewhere.

The left node pointer 1014 from root node 1000 points to node 1002 which has a node key of 00 and a search key part identifier of 1. The left node pointer 1018 from node 1002 is a self pointer. The right node pointer 1090 from node 1002 is a self-pointer.

The right pointer 1016 from root node 1000 points to node 1006 which has a node key of 111 and a search key part identifier of 2. The left node pointer 1058 from node 1006 points to node 1008 and the right node pointer 1032 from node 1006 is a self pointer. Node 1008 has a node key of 1101100 and search key part identifier of 5. The left node pointer 1060 from node 1008 points to node 1010. Node 1010 has a node key of 1101101 and a search key part identifier of 6. The left node pointer 1024 from node 1010 is an ancestor pointer to node 1008 and the right pointer 1026 from node 1010 is a self pointer. The right node pointer 1062 from node 1008 points to node 1012. Node 1012 has a node key of 11011101 and a search key part identifier of 5. The left node pointer 1028 from node 1012 is a self pointer and the right node pointer 1030 from node 1012 is also a self pointer.

Figure 11:
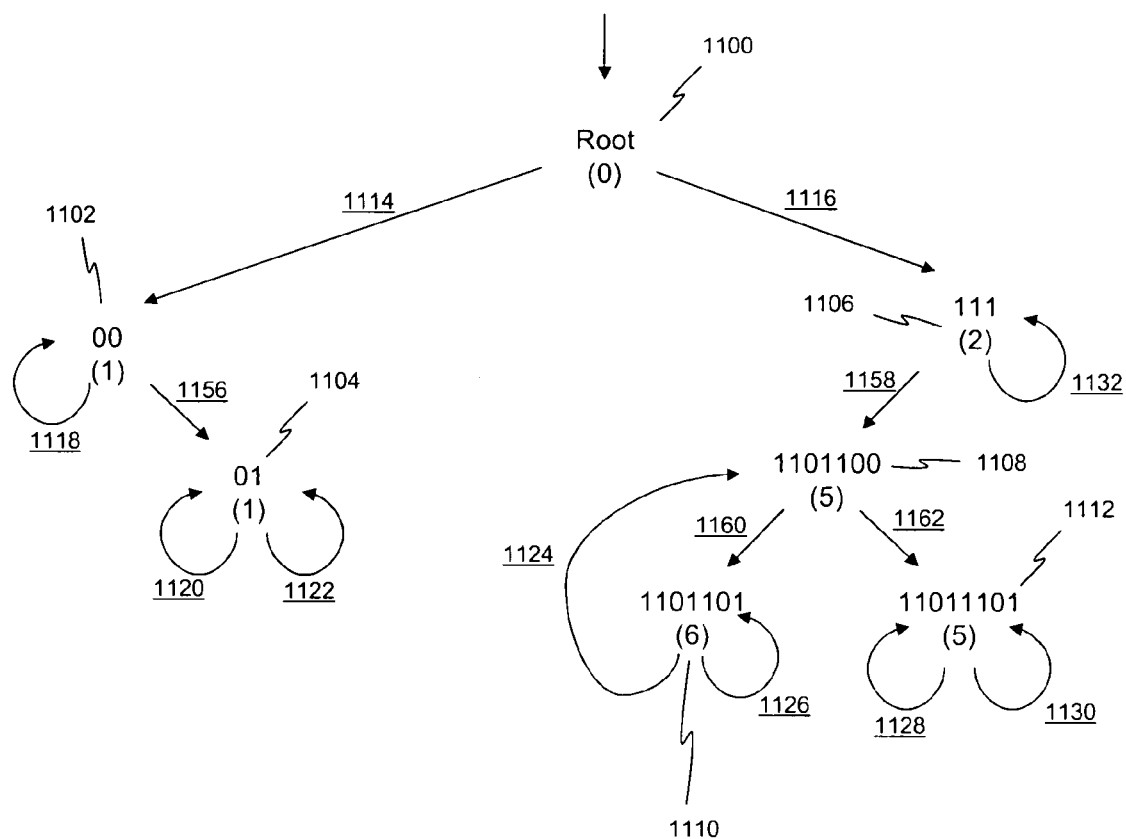
FIG. 11 is a diagram showing an extension of the tree structure of FIG. 10 according to an embodiment of the present invention.

FIG. 11 shows an extension of the tree structure of FIG. 10 by insertion of a new node according to an embodiment of the present invention. Related nodes have been given related item numbers, but '1000's in FIG. 10 compared to '1100's in FIG. 11.

The structure has an empty root node 1100 with a search key part identifier of zero (shown in brackets). The left pointer 1114 from root node 1100 points to node 1102 which has a node key of 00 and search key part identifier of 1. The left node pointer 1118 from node 1102 is a self pointer. The right node pointer 1156 from node 1102 points to node 1104. Node 1104 has a node key of 01 and search key part identifier of 1. The left node pointer 1120 from node 1104 is a self pointer and the right node pointer 1122 from node 1104 is also a self pointer.

The right pointer 1116 from root node 1100 points to node 1106 which has a node key of 111 and search key part identifier of 2. The left node pointer 1158 from node 1106 points to node 1108 and the right node pointer 1132 from node 1106 is a self pointer. Node 1108 has a node key of 1101100 and search key part identifier of 5. The left node pointer 1160 from node 1108 points to node 1110. Node 1110 has a node key of 1101101 and search key part identifier of 6. The left node pointer 1124 from node 1110 is an ancestor pointer to node 1108 and the right node pointer 1126 from node 1110 is a self pointer. The right node pointer 1162 from node 1108 points to node 1112. Node 1112 has a node key of 11011101 and a search key part identifier of 5. The left node pointer 1128 from node 1112 is a self pointer and the right pointer 1130 from node 1112 is also a self pointer.

Forming the structure of FIG. 11 involves inserting an additional node 1104 with a node key of 01 and search key part identifier of 1 into the structure of FIG. 10. This insertion will be carried out according to procedure C shown in FIG. 9, as the search key 01 corresponding to the node key of the node to be inserted, neither exactly matches, nor is prefixed by, nor is a prefix for, any of the node keys of nodes already in the tree.

Insertion of the new node involves searching the tree of FIG. 10 using a search key of 01. This search will result in traversal of node 1002 where self-pointer 1090 is followed. In this case, the node having a node key which differs from the search key at a particular bit position is node 1002 with node key 00. The new node will thus be inserted below node 1002 as shown in FIG. 11 as new node 1104. This node has no subtree, so two self-pointers are created to/from node 1104 and right pointer 1090 from node 1002 is adjusted to be a child pointer 1156 from node 1102 to new node 1104.

Figure 12:
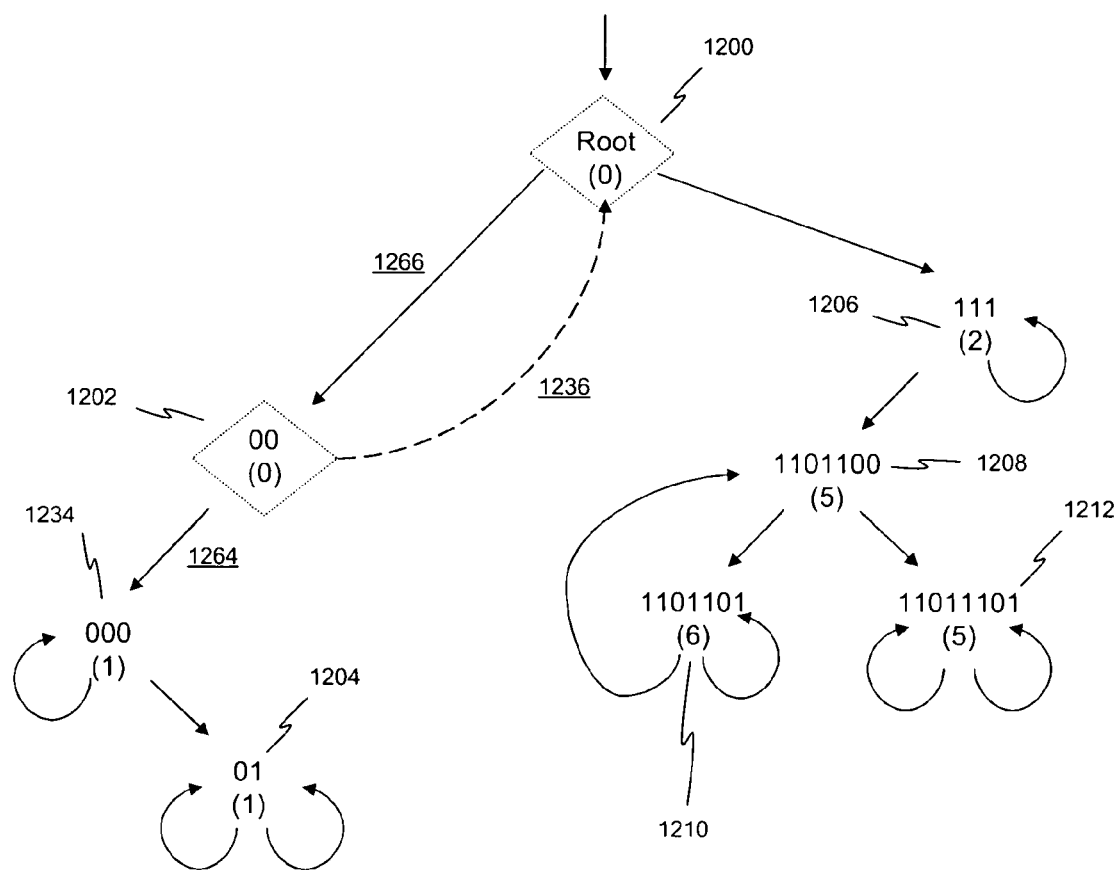
FIG. 12 is a diagram showing an extension of the tree structure of FIG. 11 according to an embodiment of the present invention.

FIG. 12 shows an extension of the tree structure of FIG. 11 by insertion of a new node according to an embodiment of the present invention.

Forming the structure of FIG. 12 involves inserting a new node 1234 with a node key of 000 and search key part identifier of 1 into the structure. In this case, the new node will not be a skipped-prefix node itself. However, the key to be inserted, 000, is prefixed by the node key 00 of existing node 1202. This means that node 1202 will be updated to be a skipped-prefix node.

Insertion of the additional node involves searching the tree of FIG. 11 using a search key of 000. Searching using the search key 000 will identify node 1102. The new node to be added for key 000 is added below node 1102 where the search ended, according to Procedure B as shown in FIG. 8. This is depicted in FIG. 12, where the newly inserted node 1234 is located below node 1202 in the tree.

Newly inserted node 1234 is allocated a search key part identifier equal to that of the node above it in the tree (step 810), which in this case is that of node 1102, i.e. a search key part identifier equal to 1.

The node key 000 of new node 1234 is prefixed by the node key 00 of node 1202 above it, so node 1202 is updated to be a skipped-prefix node.

The fact that node 1202 is now a skipped-prefix node is denoted by the dotted diamond around it. The left node pointer 1114 from root node 1100 is adjusted to point 1266 to skipped-prefix node 1202 below it in the tree. Left node pointer 1118 from skipped-prefix node 1202 is adjusted to point to node 1234. Right node pointer 1156 from skipped-prefix node 1202 is adjusted to be a skip-back pointer 1236 to root node 1200 above it in the tree.

The root node has also has a dotted diamond around it to denote it is a skipped-prefix node, as its empty node key prefixes the node keys of all other nodes in the tree.

The fact that pointer 1236 is a skip-back node pointer is denoted by the dashed arrow notation in FIG. 12. Skip-back node pointer 1236 points back to the node with the next skipped-prefix node above node 1202, which in this case is root node 1200 with an empty key.

As described above, node 1202 is now a skipped-prefix node, so its search key part identifier is updated to be the same as that of its parent, the parent being in this case root node 1200 with a search key part identifier of zero (step 812).

During subsequent searching of the structure of FIG. 12, skipped-prefix node 1202 with node key 00 will always be skipped and the search process will always move directly on to traverse node 1234 with node key 000.

Figure 13:
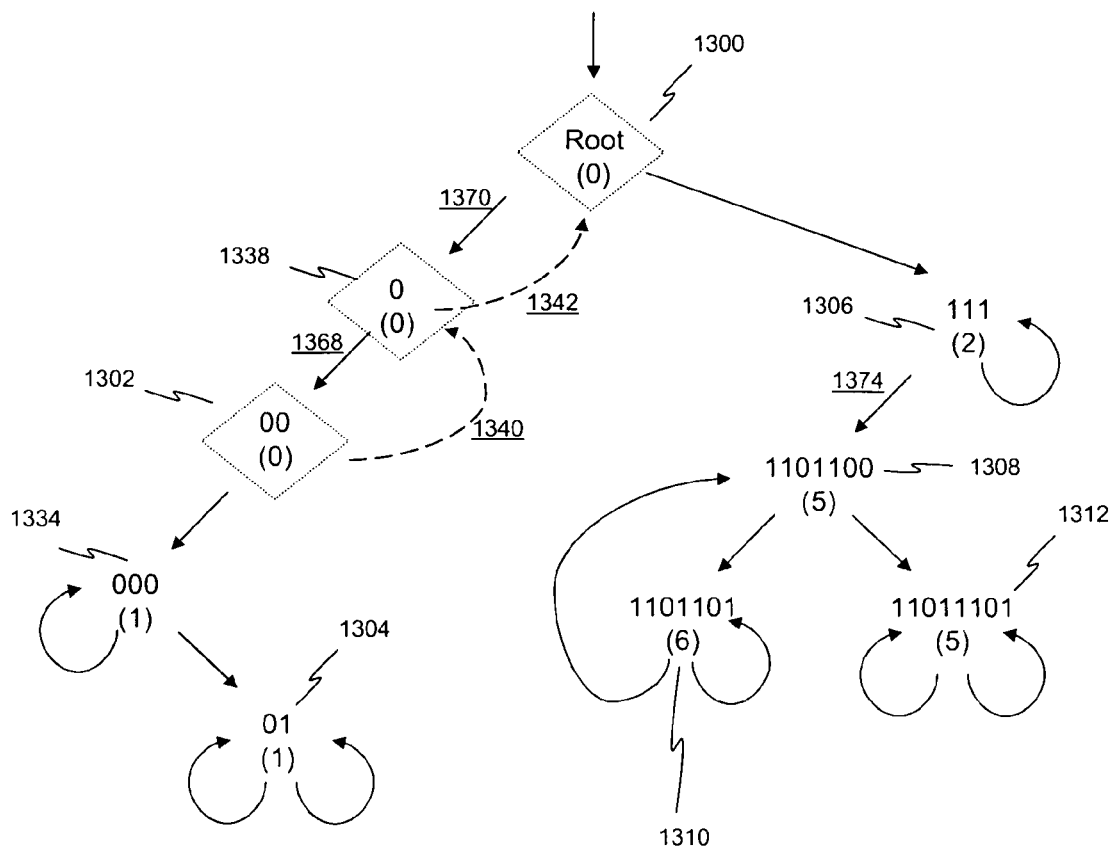
FIG. 13 is a diagram showing an extension of the tree structure of FIG. 12 according to an embodiment of the present invention.

FIG. 13 shows an extension of the tree structure of FIG. 12 by insertion of a further skipped-prefix node according to an embodiment of the present invention.

Forming the structure of FIG. 13 involves inserting a further skipped-prefix node 1338 with a node key of 0 into the structure. Insertion of the further skipped-prefix node involves searching the tree of FIG. 12 using a search key of 0. The search key 0 prefixes the node key 00 of node 1202, so searching using the search key 0 will identify node 1202. The new skipped-prefix node to be added for key 0 is added above node 1202 where the search ended, according to Procedure A as shown in FIG. 7. This is depicted in FIG. 13, where the new skipped-prefix node 1338 is located above node 1302 in the tree.

This further node 1338 is a skipped-prefix node, denoted by the dotted diamond around it. The left node pointer 1266 from root node 1200 is adjusted to point 1370 to further skipped-prefix node 1338. A left node pointer 1368 from further skipped-prefix node 1338 is created to point to node 1302 below it in the tree. A right pointer 1342 from further skipped-prefix node 1338 is created as a skip-back pointer to root node 1300 above it in the tree.

The skip-back pointer 1236 from skipped-prefix node 1202 is adjusted to point back to the next skipped-prefix node above it, which in this case is node 1338, as shown by skip-back pointer 1340. Skip-back pointer 1342 points back to the next skipped-prefix above node 1338, which in this case is root node 1300 with an empty key. This reverse path of skipped-prefix pointers up the tree may be followed in order to find the sequence of potential prefix matches for a search key.

As before, further skipped-prefix node 1338 inherits the same search key part identifier as its parent, the parent being in this case root node 1300 with a search key part identifier of zero. During subsequent searching of the structure of FIG. 13, skipped-prefix nodes 1338 and 1302, with node keys 0 and 00 respectively, will be skipped and the searching will move directly on to traverse node 1334 having node key 000.

Figure 14:
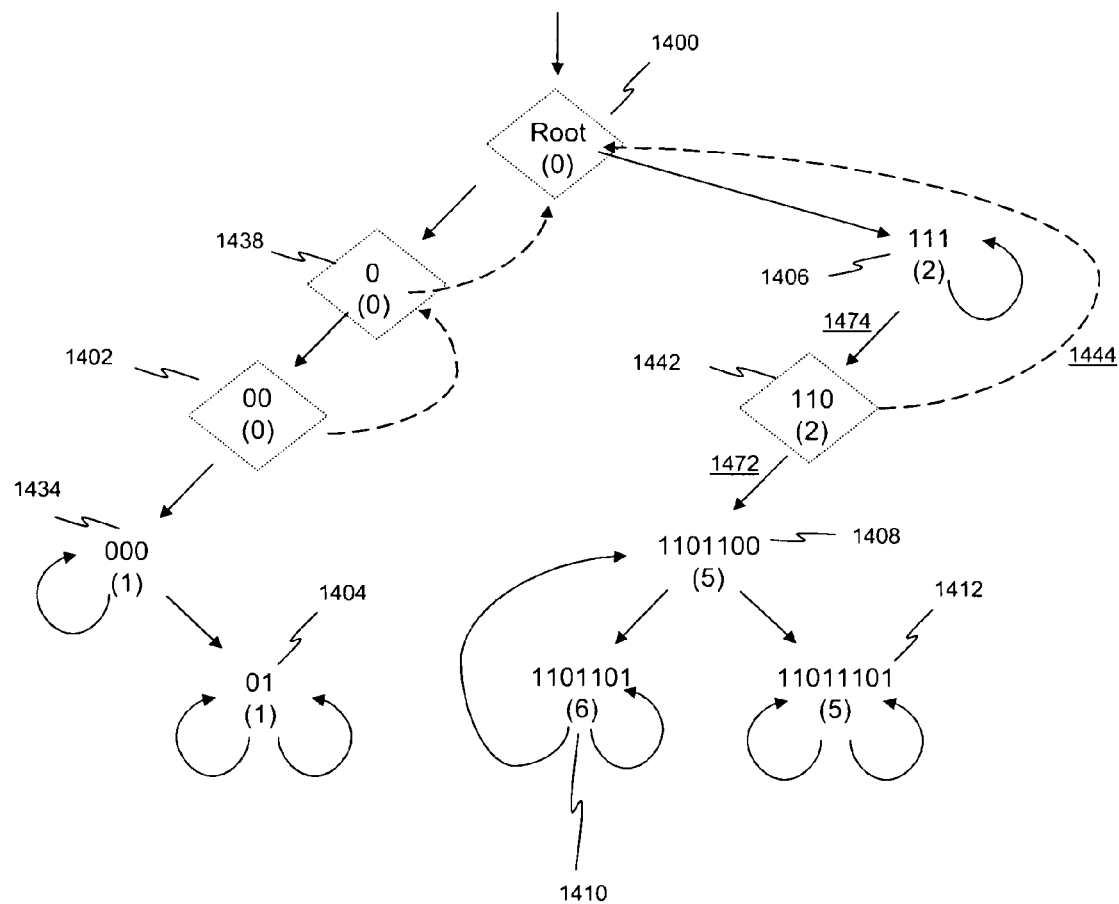
FIG. 14 is a diagram showing an extension of the tree structure of FIG. 13 according to an embodiment of the present invention.

FIG. 14 shows an extension of the tree structure of FIG. 13 by insertion of a still further skipped-prefix node according to an embodiment of the present invention.

Forming the structure of FIG. 14 involves inserting a still further skipped-prefix node 1442 with a node key of 110 into the structure. Insertion of the new node involves searching the tree of FIG. 13 using a search key of 110. The search key 110 prefixes the node key 1101100 of node 1308, so searching the tree using the search key 110 will identify node 1308.

The new skipped-prefix node to be added with node key 110 is added above node 1308 where the search ended, according to Procedure A as shown in FIG. 7. This is depicted in FIG. 14, where the new skipped-prefix node 1442 is located above node 1408 in the tree.

The left node pointer 1374 from node 1306 is adjusted to point 1474 to new skipped-prefix node 1442. A left node pointer 1472 from new skipped-prefix node 1442 is created pointing to node 1408 below it in the tree. A right node pointer 1444 from new skipped-prefix node 1442 is created as a skipped-prefix pointer to root node 1400. Skipped-prefix pointer 1444 points back to the node that is the next skipped-prefix ancestor above node 1442, which in this case is root node 1400 with an empty key.

As before, new skipped-prefix node 1442 inherits the same search key part identifier as its parent, the parent being in this case being node 1406 with a search key part identifier of 2.

Figure 15:
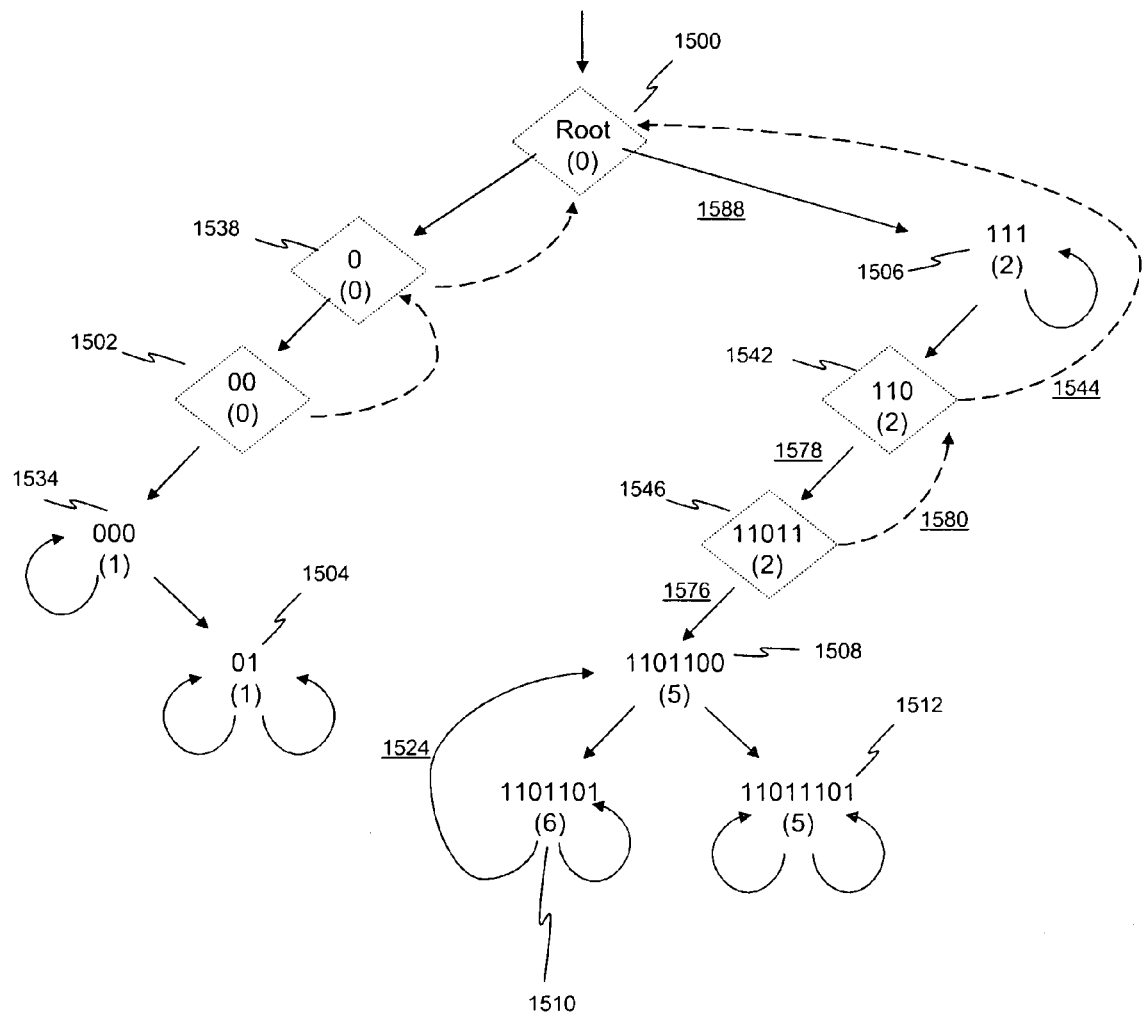
FIG. 15 is a diagram showing an extension of the tree structure of FIG. 14 according to an embodiment of the present invention.

FIG. 15 shows an extension of the tree structure of FIG. 14 by insertion of a yet still further skipped-prefix node according to an embodiment of the present invention.

Forming the structure of FIG. 15 involves inserting a new further skipped-prefix node 1546 with a node key of 11011 into the structure. Insertion of the new skipped-prefix node involves searching the tree of FIG. 14 using the search key 11011. The search key 11011 prefixes node key 1101100 of node 1408, so searching the tree using this search key identifies node 1408 whose search key part identifier of indicates a bit that is beyond the end of the five bit search key. Here the node key for the node to be inserted is a prefix of the node key at the node found in the search, so the node to be added for search key 11011 is added above node 1408 where the search ended.

The new skipped-prefix node to be added with node key 11011 is added above node 1408 where the search ended, according to Procedure A as shown in FIG. 7. This is depicted in FIG. 15, where the new skipped-prefix node 1546 is located above node 1508 in the tree.

New skipped-prefix node 1546 is a skipped-prefix node, denoted by the dotted diamond around it. The left node pointer 1472 from skipped-prefix node 1442 is adjusted to point 1578 to new skipped-prefix node 1546 below it in the tree. A left node pointer 1576 from new skipped-prefix node 1546 is created to point to node 1508 below it in the tree. A right node pointer 1580 from new skipped-prefix node 1546 is created as a skipped-prefix pointer to skipped-prefix node 1542 above it in the tree. Skipped-prefix pointer 1580 points back to the next skipped-prefix node above node 1546, which in this case is node 1542.

As before, new skipped-prefix node 1546 inherits the same search key part identifier as its parent, the parent being in this case being skipped-prefix node 1542 with a search key part identifier of two. During subsequent searching of the structure of FIG. 15, skipped-prefix nodes 1542 and 1546 with node keys 110 and 11011 respectively will be skipped and the search process will move on to traverse node 1508 with node key 1101100.

Figure 16:
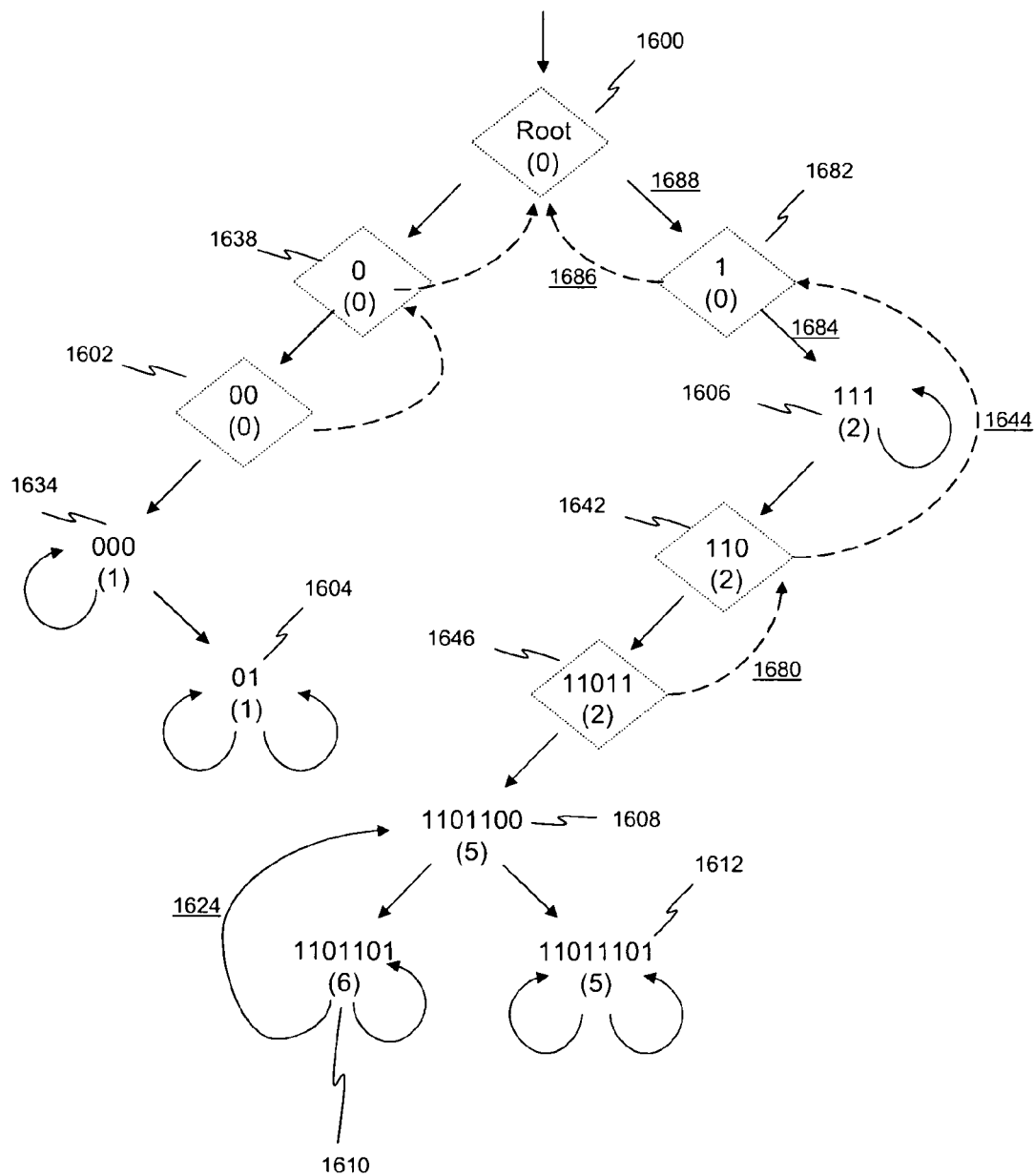
FIG. 16 is a diagram showing an extension of the tree structure of FIG. 15 according to an embodiment of the present invention.

FIG. 16 shows an extension of the tree structure of FIG. 15 by insertion of another skipped-prefix node according to an embodiment of the present invention.

Forming the structure of FIG. 16, involves inserting a new skipped-prefix node 1682 with a node key of 1 into the structure. Insertion of the new node involves searching the tree of FIG. 15 using a search key of 1. The search key 1 prefixes the node key 111 of node 1606, so searching of the tree using this search key identifies node 1506.

The new skipped-prefix node to be added for node key 1 is added above node 1606 identified in the search, according to Procedure A as shown in FIG. 7. This is depicted in FIG. 16, where the new skipped-prefix node 1682 is located above node 1606 in the tree.

The right node pointer 1588 from root node 1500 is adjusted to point 1688 to new skipped-prefix node 1682. A right node pointer 1684 from new skipped-prefix node 1682 is created pointing to node 1606 below it in the tree. A left node pointer 1686 from new skipped-prefix node 1682 is created as a skipped-prefix pointer to root node 1600.

Skipped-prefix pointer 1544 from node 1542 is adjusted to point 1644 back to the next skipped-prefix node above node 1642, which in this case is node 1682 with a node key of 1. Note that skipped-prefix pointer 1644 in this case does not point to node 1606 immediately above node 1642 in the tree, but to node 1682 above node 1644. This is because node 1606 with node key 111 is not itself a skipped-prefix node, whereas node 1682 with node key 1 is a skipped-prefix node.

As before, new skipped-prefix node 1682 inherits the same search key part identifier as its parent, the parent being in this case root node 1600 with a search key part identifier of zero.

The extended tree structure shown in FIG. 16 can be seen to have a total of six skipped-prefix nodes, including the root node.

The extended tree of FIG. 16 can be searched by carrying out a search process using a search key in order to check whether the tree contains a node key corresponding to the search key. The search process, which begins at root node 1600, is now described for a number of different search keys. A zero in the search key corresponds to a left branch and a one in the search key corresponds to a right branch. A search ends when a pointer to a node upwards in the tree or a self pointer is followed, or a search key part identifier of a traversed node indicates a bit that is beyond the end of the search key in question.

Example search key: k=0100:

The search process starts at root node 1600 with an empty key and a search key part identifier of 0, shown by item 1600 in FIG. 16. Bit 0 of the search key is a zero, so the search process branches left from there along the left node pointer from root node 1600 to traverse skipped-prefix node 1638 which has a search key part identifier of zero. Bit zero of the search key is a zero, so the search process branches left along the left node pointer from skipped-prefix node 1638 to traverse skipped-prefix node 1634 which has a search key part identifier of zero. Bit zero of the search key is a zero, so the search process branches left along the left node pointer from skipped-prefix node 1634 to traverse node 1606. The search process is now at node 1606 which has a search key part identifier of 1. Bit 1 of the search key is a 1, so the search process branches right along the right node pointer from node 1606 to traverse node 1604. The search process is now at node 1604 which has a search key part identifier of 1. Bit 1 of the search key is a 1, so the search process branches right along the right node pointer from node 1604, which is a self pointer to the same node 1604, so the search ends here.

Comparing the search key with the node key at the node results in a match up to the node key length, i.e. the first two bits of the search key match the two bits of the node key at the node. This means that the first two bits of the search key, i.e. 01, are the longest prefix in the tree for this search key.

Example search key: k=0011:

The search process starts at root node 1600 with an empty key and a search key part identifier of 0, shown by item 1600 in FIG. 16. Bit 0 of the search key is a zero, so the search process branches left from there along the left node pointer from root node 1600 to traverse skipped-prefix node 1638. The search process is now at skipped-prefix node 1638 which has a search key part identifier of zero. Bit zero of the search key is a zero, so the search process branches left along the left node pointer from skipped-prefix node 1638 to traverse skipped-prefix node 1634. The search process is now at skipped-prefix node 1634 which has a search key part identifier of zero. Bit zero of the search key is a zero, so the search process branches left along the left node pointer from skipped-prefix node 1634 to node 1606. The search process is now at node 1606 which has a search key part identifier of 1. Bit 1 of the search key is a 0, so the search process branches left along the left node pointer from node 1606 which is a self pointer to the same node 1606, so the search ends here.

Comparison of the search key with the node key at the node does not result in a match. The last skipped-prefix node that was encountered during the search process was node 1634 with node key 00. The search key is then compared with the node key at this node, where it is seen that the first two bits of the search key match the node key of node 1634. This means that the first two bits of the search key, i.e. 00, form the longest prefix in the tree for this search key.

Example search key: k=110111111:

The search process starts at root node 1600 with an empty key and a search key part identifier of 0, shown by item 1600 in FIG. 16. Bit 0 of the search key is a 1, so the search process branches right from there along the right node pointer 1688 from root node 1600 to traverse skipped-prefix node 1682. The traversal process is now at skipped-prefix node 1682 which has a search key part identifier of zero. Bit zero of the search key is a 1, so the search process branches right along the right node pointer 1684 from skipped-prefix node 1682 to traverse node 1606. The search process is now at node 1606 which has a search key part identifier of 2. Bit 2 of the search key is a zero, so the search process branches left along the left node pointer from node 1606 to traverse node 1642. The search process is now at skipped-prefix node 1642 which has a search key part identifier of 2. Bit 2 of the search key is a 0, so the search process branches left along the left node pointer from skipped-prefix node 1642 to traverse skipped-prefix node 1646. The search process is now at skipped-prefix node 1646 which has a search key part identifier of 2. Bit 2 of the search key is a 0, so the search process branches left along the left node pointer from skipped-prefix 1646 to traverse node 1608. The search process is now at node 1608 which has a search key part identifier of 5. Bit 5 of the search key is a 1, so the search process branches right along the right node pointer from node 1608 to traverse node 1612. The search process is now at node 1612 which has a search key part identifier of 5. Bit 5 of the search key is a 1, so the search process branches right along the right node pointer from node 1612, which is a self pointer to node 1612, so the search ends here.

Comparison of the search key with the node key at the node does not result in a match. The last skipped-prefix node that was encountered during the search was node 1646 with node key 11011. The search key is then compared with the node key at this node, where it is seen that there is a match up to the node key length of five bits. This means that the first five bits of the search key, i.e. 11011 form the longest prefix in the tree for this search key.

Example search key: k=110101111:

The search process for this search key proceeds as per the previous search example. Here, however, there is no match between the node key at the last skipped-prefix node encountered, i.e., node 1646 with node key 11011, and the first five digits, i.e. 11010, of the search key. The skip-back node pointer 1680 is then followed to the previous skipped-prefix node that was encountered during the search, i.e. node 1642 with node key 110. Comparison of the search key with the node key at node 1642 results in a match up to the node key length. This means that the first three digits of the search key, i.e. 110, form the longest prefix in the tree for this search key.

The structure and algorithm of certain embodiments of the present invention performs efficiently in terms of computational complexity. When the tree structure contains no nodes with node keys that prefix any other node keys in the tree, the tree requires O(log n) computations ('of the order log n computations) for search, and also for insertion and deletion of nodes.

When the tree contains one or more skipped-prefix nodes, search behaves similarly to a conventional search to select a list of prefixes to check, followed by a linear scan of those prefixes, from best match to worst match. Hence, if a search passes through p 'skipped-prefix' nodes, lookup requires O(p+log n) computations.

The worst case search case occurs when the longest node key in the tree is prefixed by all the other node keys. In this case, the tree performs similarly to a singly-linked list and searching requires O(n)=O(p) computations.

Insertion and deletion of nodes is typically O(log n). Worst-case insertion is O(n) because a complete walk of a subtree is required to update ancestor pointers. Worst-case deletion is O(nlog n) because a deletion potentially disturbs O(log n) skipped-prefix nodes and each disturbance requires a similar walk of a subtree. However, in practice, such worst cases are not-commonly encountered, and under realistic stress, insertion and deletion have been found to behave consistently with a requirement for O(log n) computations.

The above embodiments are to be understood as illustrative examples of the invention. Further embodiments of the invention are envisaged.

For example, the in some embodiments, the invention may be applied to storage and retrieval of node addresses in Constrained Shortest Path First (CSPF) IP routing databases where fast database access and update is required, for example while the network is 'converging' or 'reconverging' as large numbers of routes are recalculated after an update to the network. Some destinations are provided as a prefix rather than a full explicit IP address, and would therefore require special handling by systems using the prior art Patricia algorithm and tree structure, which implies that such systems converge at a slower rate.

Embodiments of the invention may also be applied to storage and retrieval of IP addresses in IP Routing Information Bases (RIBs). These databases are populated by IP routing protocols, such as Open Shortest Path First (OSPF), Intermediate System-Intermediate System (IS-IS), Routing Information Protocol (RIP), Border Gateway Protocol (BGP), etc.), and represent all reachable IP addresses and IP address prefixes distributed by those routing protocols.

Certain aspects of the invention may also find application in the storage and retrieval of IP addresses in an IP routing Forwarding Information Base (FIB), where a mixture of IP address prefixes and full-length IP addresses may be included. This is the composite of all the RIBs known to a router, and can be used to populate IP forwarding tables in hardware.

The scope of the invention should not limited to IP routing applications. Embodiments of the invention may also be applied in any application where it is desirable to searching stored data without actually accessing that data. For example, data values may be stored in a location that is difficult to access such as in old or slow hardware, or which may have a constrained network bandwidth, or which may be pay-per-access, or where legal constraints exist such as copyright, etc. A storage algorithm is required to search among these data values without actually storing a copy of the data values themselves, or accessing them unnecessarily. Certain embodiments allow this, requiring only a single access to the search result.

Embodiments of the invention may be applied for prefix matching in the representation of a hierarchy such as in the field of taxonomy. A large catalogue of biological data may be efficiently represented and searched by implementing these embodiments. All categories in, for example modern Linnaean taxonomy could be represented, and a search on a particular species/subspecies would yield either an exact match or a match on the most specific order/family/genus/species presently stored.

Some embodiments of the invention may also be applied in the storage and retrieval of entries from a telephone directory. All entries in a particular area could be efficiently listed, where a prefix may be the first few digits representing a telephone dialing code or localised area. These embodiments permit quick retrieval even with a large database with billions of entries, such as all telephone numbers currently assigned globally. Here, only the length of the key being searched is significant in determining bounds on lookup times. The number of other non-prefix keys in the database has no effect on lookup time.

In some embodiments, the invention could be applied in applications where rapid manipulation of very long keys is required and where manipulation independent of key length is desirable. For example, these embodiments could be used to index all the books in a copyright library, using only a low amount of data structure storage per book. Given the first-page or full text of any book, the prefix matching properties of the invention could be used to quickly determine whether a matching book is stored or not. Certain embodiments could be employed to quickly determine whether an example text is among a large number of near-identical stored versions of the same long text. This could find particular application in modern scanning and text-reading technologies, or in comparative analyses of hand-copied ancient texts or suchlike.

Embodiments of the invention could be applied wherever efficient search and update of a massive database of keys is required. This could for example include a large quantity of biometric data for each individual currently within a particular state. The search tree constructed by these embodiments can then function in isolation from the central database. For example, the certain embodiments could be used to index and search a massive central database on mobile devices without holding or accessing any of the actual content of the database on any mobile device.

The above description primarily refers to a situation where various data such as node keys, search keys are represented in binary notation. Some embodiments of the invention are equally applicable using other data notations, for example alphanumeric notation.

Routing and forwarding are herein described as two distinct processes. However, routing and forwarding may be combined in some implementations and at least some embodiments of the invention may equally be applied to such combined implementations.

The above description describes embodiments of the presently disclosed invention in relation to IPv4 or IPv6 data, but embodiments of the invention may be used with any Internet Protocol or other suitable data formats or protocols.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of searching a database using a search key, the database containing data stored in a tree structure, the tree structure including a plurality of nodes having associated data including one or more node pointers, a node key, and a search key part identifier, the node pointers including data identifying nodes which may be traversed when searching the tree structure, the search key part identifier identifying a search key part to be used to determine a node pointer to be used when traversing a node, the method comprising:
   storing, in the database, first associated data relating to a first node of the plurality of nodes and second associated data relating to a second node of the plurality of nodes, the first associated data including a first node key and a given search key part identifier equal to the search key part identifier of the node above the first node in the plurality of nodes in the tree such that the first node is always skipped during downward traversal, and the second associated data including a second node key having an initial portion matching the first node key;
   storing, in the database, third data indicating that the second node key has an initial portion matching the first node key, the third data including a first node pointer pointing from the second node to the first node, wherein the first node pointer points from the second node to the first node in order to identify the first node as the next node above the second node in the tree structure whose node key matches an initial portion of the second node key; and
   searching the tree structure using the search key, wherein searching using the search key involves the second node being traversed, and if the first node key has an initial portion which matches the search key, the first node being identified subsequent to traversal of the second node by following the first node pointer from the second node to the first node.

2. The method of claim 1, comprising during traversal of the second node, comparing the second node key to the search key.

3. The method of claim 1, wherein the identification of the first node comprises traversing one or more nodes above the first node in the tree structure after the traversal to the second node but prior to the subsequent traversal to the first node.

4. The method of claim 1, wherein a particular node's search key part identifier relates to a search key bit to be used to determine a node pointer to be used when traversing the particular node.

5. The method of claim 4, wherein the particular node's search key part identifier relates to a relative location of a search key bit to be used compared to a previously used search key bit.

6. The method of claim 4, wherein the particular node's search key part identifier relates to an absolute location of a search key bit to be used.

7. The method of claim 1, comprising storing a data parameter in association with one or more nodes in the plurality of nodes.

8. The method of claim 7, wherein a result of a search of the tree structure comprises outputting a stored data parameter.

9. The method of claim 1, wherein the searching comprises searching using an algorithm having at least one step in common with the Patricia algorithm.

10. A method of data packet routing in a data communications network, the method comprising:
   receiving routing data associated with a route in the data communications network;
   searching a data packet routing database using a search key associated with the received routing data, the database containing data stored in a tree structure, the tree structure including a plurality of nodes having associated data including one or more node pointers, a node key, and a search key part identifier, the node pointers including data identifying nodes which may be traversed when searching the tree structure, the search key part identifier identifying a search key part to be used to determine a node pointer to be used when traversing a node, wherein the searching comprises:
      storing, in the database, first associated data relating to a first node of the plurality of nodes and second associated data relating to a second node of the plurality of nodes, the first associated data including a first node key and a given search key part identifier equal to the search key part identifier of the node above the first node in the plurality of nodes in the tree such that the first node is always skipped during downward traversal, and the second associated data including a second node key having an initial portion matching the first node key;
      storing, in the database, third data indicating that the second node key has an initial portion matching the first node key, the third data including a first node pointer pointing from the second node to the first node, wherein the first node pointer points from the second node to the first node in order to identify the first node as the next node above the second node in the tree structure whose node key matches an initial portion of the second node key; and
      searching the tree structure using the search key, wherein searching using the search key involves the second node being traversed, and if the first node key has an initial portion which matches the search key, the first node being identified subsequent to traversal of the second node by following the first node pointer from the second node to the first node; and
   on the basis of the searching of the data packet routing database, storing data associated with the route in the data packet routing database.

11. The method of claim 10, wherein the route is a new route in the network and the storing of data comprises inserting a new node into the data packet routing database corresponding to the new route.

12. The method of claim 10, wherein the route is an existing route in the network and the storing of data comprises amending data in the data packet routing database associated with the existing route.

13. The method of claim 10, comprising outputting forwarding information and/or route data associated with the route to a data packet forwarding table.

14. The method of claim 13, wherein the forwarding information and/or the route data comprise Internet Protocol (IP) address data.

15. A system for use in searching a database using a search key, the database containing data stored in a tree structure, the tree structure including a plurality of nodes having associated data including one or more node pointers, a node key, and a search key part identifier, the node pointers including data identifying nodes which may be traversed when searching the tree structure, the search key part identifier identifying a search key part to be used to determine a node pointer to be used when traversing a node, the system comprising:

at least one memory including computer program code; and at least one processor in data communication with the memory, the processor configured to:

store, in the database, first associated data relating to a first node of the plurality of nodes and second associated data relating to a second node of the plurality of nodes, the first associated data including a first node key and a given search key part identifier equal to the search key part identifier of the node above the first node in the plurality of nodes in the tree such that the first node is always skipped during downward traversal, and the second associated data including a second node key having an initial portion matching the first node key;

store, in the database, third data indicating that the second node key has an initial portion matching the first node key, the third data including a first node pointer pointing from the second node to the first node, wherein the first node pointer points from the second node to the first node in order to identify the first node as the next node above the second node in the tree structure whose node key matches an initial portion of the second node key; and search the tree structure using the search key, wherein searching using the search key involves the second node being traversed, and if the first node key has an initial portion which matches the search key, the first node being identified subsequent to traversal of the second node by following the first node pointer from the second node to the first node.

16. A non-transitory computer-readable medium with computer-executable instructions stored thereon, which, when executed cause a processor of a computing device to perform a method of searching a database using a search key, the database containing data stored in a tree structure, the tree structure including a plurality of nodes having associated data including one or more node pointers, a node key, and a search key part identifier, the node pointers including data identifying nodes which may be traversed when searching the tree structure, the search key part identifier identifying a search key part to be used to determine a node pointer to be used when traversing a node, the method comprising:

storing, in the database, first associated data relating to a first node of the plurality of nodes and second associated data relating to a second node of the plurality of nodes, the first associated data including a first node key and a given search key part identifier equal to the search key part identifier of the node above the first node in the plurality of nodes in the tree such that the first node is always skipped during downward traversal, and the second associated data including a second node key having an initial portion matching the first node key;

storing, in the database, third data indicating that the second node key has an initial portion matching the first node key, the third data including a first node pointer pointing from the second node to the first node, wherein the first node pointer points from the second node to the first node in order to identify the first node as the next node above the second node in the tree structure whose node key matches an initial portion of the second node key; and searching the tree structure using the search key, wherein searching using the search key involves the second node being traversed, and if the first node key has an initial portion which matches the search key, the first node being identified subsequent to traversal of the second node by following the first node pointer from the second node to the first node.

17. A system for data packet routing in a data communications network, the system comprising:

at least one memory including computer program code; and at least one processor in data communication with the memory, the processor configured to:

receive routing data associated with a route in the data communications network;

search a data packet routing database using a search key associated with the received routing data, the database containing data stored in a tree structure, the tree structure including a plurality of nodes having associated data including one or more node pointers, a node key, and a search key part identifier, the node pointers including data identifying nodes which may be traversed when searching the tree structure, the search key part identifier identifying a search key part to be used to determine a node pointer to be used when traversing a node, wherein the search comprises:

storing, in the database, first associated data relating to a first node of the plurality of nodes and second associated data relating to a second node of the plurality of nodes, the first associated data including a first node key and a given search key part identifier equal to the search key part identifier of the node above the first node in the plurality of nodes in the tree such that the first node is always skipped during downward traversal, and the second associated data including a second node key having an initial portion matching the first node key;

storing, in the database, third data indicating that the second node key has an initial portion matching the first node key, the third data including a first node pointer pointing from the second node to the first node, wherein the first node pointer points from the second node to the first node in order to identify the first node as the next node above the second node in the tree structure whose node key matches an initial portion of the second node key; and searching the tree structure using the search key, wherein searching using the search key involves the second node being traversed, and if the first node key has an initial portion which matches the search key, the first node being identified subsequent to traversal of the second node by following the first node pointer from the second node to the first node; and on the basis of the searching of the data packet routing database, store data associated with the route in the data packet routing database.

18. A non-transitory computer-readable medium with computer-executable instructions stored thereon, which, when executed cause a processor of a computing device to perform a method of data packet routing in a data communications network, the method comprising:

receiving routing data associated with a route in the data communications network;

searching a data packet routing database using a search key associated with the received routing data, the database containing data stored in a tree structure, the tree structure including a plurality of nodes having associated data including one or more node pointers, a node key, and a search key part identifier, the node pointers including data identifying nodes which may be traversed when searching the tree structure, the search key part identifier identifying a search key part to be used to determine a node pointer to be used when traversing a node, wherein the searching comprises:

storing, in the database, first associated data relating to a first node of the plurality of nodes and second associated data relating to a second node of the plurality of nodes, the first associated data including a first node key and a given search key part identifier equal to the search key part identifier of the node above the first node in the plurality of nodes in the tree such that the first node is always skipped during downward traversal, and the second associated data including a second node key having an initial portion matching the first node key;

storing, in the database, third data indicating that the second node key has an initial portion matching the first node key, the third data including a first node pointer pointing from the second node to the first node, wherein the first node pointer points from the second node to the first node in order to identify the first node as the next node above the second node in the tree structure whose node key matches an initial portion of the second node key; and searching the tree structure using the search key, wherein searching using the search key involves the second node being traversed, and if the first node key has an initial portion which matches the search key, the first node being identified subsequent to traversal of the second node by following the first node pointer from the second node to the first node; and on the basis of the searching of the data packet routing database, storing data associated with the route in the data packet routing database.

\* \* \* \* \*